US006772062B2

(12) United States Patent
Lasky et al.

(10) Patent No.: US 6,772,062 B2
(45) Date of Patent: Aug. 3, 2004

(54) INTELLIGENT ULTRA HIGH SPEED DISTRIBUTED SENSING SYSTEM AND METHOD FOR SENSING ROADWAY MARKERS FOR INTELLIGENT VEHICLE GUIDANCE AND CONTROL

(75) Inventors: Ty A. Lasky, Santa Rosa, CA (US); Stephen M. Donecker, Davis, CA (US); Kin S. Yen, Davis, CA (US); Bahram Ravani, El Macero, CA (US)

(73) Assignee: The Regents of the University of California, Oakland, CA (US)

( * ) Notice: Subject to any disclaimer, the term of this patent is extended or adjusted under 35 U.S.C. 154(b) by 66 days.

(21) Appl. No.: 10/042,452

(22) Filed: Jan. 8, 2002

(65) Prior Publication Data

US 2003/0046021 A1 Mar. 6, 2003

Related U.S. Application Data

(60) Provisional application No. 60/295,373, filed on May 31, 2001.

(51) Int. Cl.$^7$ .......................... G01C 21/04; G06F 17/10
(52) U.S. Cl. ....................... 701/207; 180/168; 702/152; 702/95; 700/61; 700/66; 700/68; 700/301
(58) Field of Search ..................... 701/207, 224, 701/1, 208, 23; 340/933, 939, 941; 702/150, 152, 94, 95; 700/56, 58, 61, 62, 66, 68, 302; 180/167, 168

(56) References Cited

U.S. PATENT DOCUMENTS

| | | | | |
|---|---|---|---|---|
| 3,668,624 A | * | 6/1972 | Spaulding | 340/905 |
| 4,043,418 A | | 8/1977 | Blakeslee | 180/168 |
| 4,278,142 A | | 7/1981 | Kono | 180/168 |
| 4,307,329 A | | 12/1981 | Taylor | 180/168 |
| 4,307,791 A | | 12/1981 | De Bruine | 180/168 |
| 4,310,862 A | | 1/1982 | Schwarz | 360/68 |
| 4,348,652 A | | 9/1982 | Barnes et al. | 340/904 |
| 4,401,181 A | | 8/1983 | Schwarz | 180/168 |
| 4,472,716 A | | 9/1984 | Hansen | 340/905 |
| 4,524,314 A | | 6/1985 | Walker | 318/587 |
| 4,566,032 A | | 1/1986 | Hinooka et al. | 358/103 |
| 4,588,041 A | | 5/1986 | Tsuchihashi | 180/168 |
| 4,628,453 A | | 12/1986 | Kamejima et al. | 701/28 |
| 4,652,004 A | | 3/1987 | Wirth et al. | 180/168 |
| 4,680,715 A | | 7/1987 | Pawelek | 701/207 |
| 4,714,124 A | | 12/1987 | Laib | 180/168 |

(List continued on next page.)

OTHER PUBLICATIONS

"Task D: Laterial–Longitudinal Control Analysis: vol. 1: Executive Summary," Lockheed, U.S. Department of Transportation, Federal Highway Administration, Publication No. FHWA–RD–95–048, pp. 1–358, Nov., 1995.

(List continued on next page.)

Primary Examiner—Thomas G. Black
Assistant Examiner—Ronnie Mancho
(74) Attorney, Agent, or Firm—John P. O'Banion

(57) ABSTRACT

Methods and apparatus to sense both discrete and continuous magnetic reference systems installed in the roadway, and provide information to support lateral and, to some extent, longitudinal and vertical vehicle control and/or driver assistance. The position of an object, such as a vehicle, relative to a magnetic reference infrastructure, such as that representing a dividing line on a roadway, is determined by sensing, with a sensor associated with the object, at least one axial field strength component of the magnetic field emitted from the magnetic reference, computing a ratio of the sensed axial field strength components, and then determining the positional offset of the object as a function of the ratio. The lateral offset is independent of the magnetic field strength due to the use of the ratio which cancels out the magnetic field strength. The invention is also capable of providing three-dimensional positioning relative to a magnetic reference.

88 Claims, 33 Drawing Sheets

U.S. PATENT DOCUMENTS

| | | | | |
|---|---|---|---|---|
| 4,800,978 | A | | 1/1989 | Wasa et al. ................. 180/168 |
| 4,847,774 | A | | 7/1989 | Tomikawa et al. .......... 701/207 |
| 4,855,822 | A | | 8/1989 | Narendra et al. ........... 348/114 |
| 4,890,233 | A | | 12/1989 | Ando et al. ................. 701/207 |
| 4,908,557 | A | | 3/1990 | Sudare et al. ............... 318/587 |
| 4,990,841 | A | | 2/1991 | Elder .......................... 318/587 |
| 5,000,279 | A | | 3/1991 | Kondo et al. ............... 180/168 |
| 5,163,001 | A | | 11/1992 | Luke, Jr. ...................... 701/23 |
| 5,191,528 | A | | 3/1993 | Yardley et al. ............... 701/29 |
| 5,331,561 | A | | 7/1994 | Barrett et al. ................ 701/207 |
| 5,347,456 | A | | 9/1994 | Zhang et al. .................. 701/29 |
| 5,357,437 | A | * | 10/1994 | Polvani ....................... 701/207 |
| 5,390,118 | A | | 2/1995 | Margolis et al. .............. 701/29 |
| 5,467,283 | A | | 11/1995 | Butsuen et al. ............. 701/207 |
| 5,661,454 | A | | 8/1997 | Bezard et al. ................. 701/23 |
| 5,684,490 | A | | 11/1997 | Young et al. ............... 701/207 |
| 5,708,427 | A | | 1/1998 | Bush ........................... 701/29 |
| 5,710,424 | A | | 1/1998 | Theodoras, II et al. ....... 701/29 |
| 5,757,472 | A | | 5/1998 | Wangler et al. ............ 356/4.01 |
| 5,765,116 | A | | 6/1998 | Wilson-Jones et al. ..... 701/207 |
| 5,781,119 | A | | 7/1998 | Yamashita et al. ............ 701/29 |
| 5,793,491 | A | | 8/1998 | Wangler et al. ............... 701/23 |
| 5,815,825 | A | | 9/1998 | Tachibana et al. ............ 701/23 |
| 5,853,846 | A | | 12/1998 | Clark et al. ................... 701/24 |
| 5,875,408 | A | | 2/1999 | Bendett et al. ................ 342/70 |
| 5,896,190 | A | | 4/1999 | Wangler et al. ............. 324/326 |
| 5,913,376 | A | | 6/1999 | Takei ........................... 701/23 |
| 5,917,326 | A | | 6/1999 | Gonzalez et al. ........... 428/131 |
| 5,926,126 | A | | 7/1999 | Engelman ................... 342/988 |
| 5,927,603 | A | * | 7/1999 | McNabb ...................... 239/63 |
| 5,928,294 | A | | 7/1999 | Zelinkovsky ............... 324/345 |
| 5,934,399 | A | * | 8/1999 | Iiboshi et al. ............... 180/169 |
| 5,938,707 | A | | 8/1999 | Uehara ........................ 340/901 |
| 5,942,993 | A | | 8/1999 | Mio et al. .................... 342/457 |
| 5,979,581 | A | | 11/1999 | Ravani et al. ............... 701/117 |
| 5,987,374 | A | | 11/1999 | Akutsu et al. ................ 701/41 |
| 6,005,517 | A | | 12/1999 | Friedrichs .................. 342/457 |
| 6,097,312 | A | * | 8/2000 | Tanji et al. .................. 340/905 |
| 6,157,320 | A | | 12/2000 | Yujiri et al. ................. 340/901 |
| 6,169,940 | B1 | * | 1/2001 | Jitsukata et al. .............. 701/23 |
| 6,336,064 | B1 | * | 1/2002 | Honkura et al. .............. 701/23 |
| 6,546,249 | B1 | * | 4/2003 | Imai et al. ................... 455/436 |
| 2001/0041953 | A1 | * | 11/2001 | Jitsukata et al. .............. 701/28 |
| 2002/0022926 | A1 | * | 2/2002 | Suzuki ........................ 701/207 |

OTHER PUBLICATIONS

Nookala, Marthand, Bahler, Stephen J.; Minnesota Guidestar Intelligent Vehicle Initiative Lateral Guidance and Collision Warning, 1998–1999 Snowplow Demonstration Project, pp. 1–10, (1998).

Shladover, Steven E., "Automatic Vehicle Control Developemnts in the Path Program," IEEE Transactions on Vehicular Technology, vol. 40, No. 1, pp. 114–130, Feb., 1991.

Steinfeld, Aaron, Tan, Han–Shue; "Preliminary Findings for a Lane–Keeping and Collision–Warning Driver Interface for Snowplow Operations," California PATH Program, Institute of Transportation Studies, pp. 1–23, May, 1999.

Yen, Kin S. et al.; "Development of an Advanced Snowplow Driver Assistance System (ASP–II)," California AHMCT Program, University of California—Davis, California Department of Transportation, Final Report of Contract RTA65A0054, pp. 1–79, Jun. 30, 2000.

Yen, Kin S. et al.; "Advanced Snowplow Development and Demonstration: PhaseI: Driver Assistance," California AHMCT Program, University of California—Davis, California Department of Transportation, Final Report of Contract UCD–ARR–99–06–30–03, pp. 1–99, Jun. 30, 1999.

Zhang, Wei–Bin, et al.; "Implementing Advanced Vehicle Control and Safety Systems (AVCSS) for Highway Maintenance Operations," California PATH Program, University of California at Berkeley, pp. 1–7, (1997).

"Resource Materials: Lateral and Longitudinal Control Analysis," Delco, U.S. Department of Transportation, Federal Highway Administration, Publication No. FHWA–RD–95–140, pp. 1–185, Nov., 1994.

Patwardhan, Satyajit, Tan, Han–Shue, Guldner, Jurgen, Tomizuka, Masayoshi; "Lane Following During Backward Driving for Front Wheel Steered Vehicles," Proceedings of the American Control Conference, Albuquerque, New Mexico, pp. 3348–3353, Jun., 1997.

Ono, Osamu; "High–Precision Position Detection Using Magnetic Vectors," Automotive Electronics Development Division, NEC Corporation, 484 Tsukagoshi 3–chome, Saiwai–ku, Kawasaki, Kanagawa, Japan, pp. 1–8, (1999).

Guldner, Jurgen et al.; "Robust Automatic Steering Control for Look–Down Reference Systems With Front and Rear Sensors," IEEE Transactions on Control Systems Technology, vol. 7, No. 1, pp. 2–11, Jan., 1999.

Bantli, Heinrich et al.; "Characterization of Ambient Magnetic Fields: Signal Processing Requirements for a Magnetic Lateral Driver Assist or Guidance System," 3M, pp. 1–9, (1999).

Feng, Kai–Ten et al.; "Look–Ahead Human–Machine Interface for Assistance of Manual Vehicle Steering," Proceedings of the American Control Conference, San Diego, California, pp. 1228–1232, Jun., 1999.

Choi, Seibum B.; "The Design of a Look–Down Feedback Adaptive Controller for the Laterial Control of FrontWheel-–Steering Autonomous Highway Vehicle," Proceedings of the American Control Conference, Albuquerque, New Mexico, pp. 1603–1607, Jun., 1997.

"Resource Materials—Lateral and Longitudinal Control Analysis," Calspan, U.S. Department of Transportation, Federal Highway Administration, Publication No. FHWA–RD–95–122, pp. 1–284, Nov., 1995.

Bender, James G.; "An Overview of Systems Studies of Automated Highway Systems," IEEE Transactions on Vehicular Technology, vol. 40, No. 1, pp. 82–99, Feb., 1991.

Fenton, Robert E. and Mayhan, Robert J.; "Automated Highway Studies at the Ohio State University—An Overview," IEEE Transactions on Vehicular Technology, vol. 40, No. 1, pp. 100–113, Feb., 1991.

Hopstock, David M. and Wald, Leon D.; "Verification of Field Model for Magnetic Pavement Marking Tape," IEEE Transaction on Magnetics, vol. 32, No. 5, pp. 5088–5090, Sep., 1996.

Lasky, T.A., Yen, K.S. and Ravani, B.; "Advanced Construction and Maintenance Systems (ACMS) for Winter Operations in Rural Environments," Advanced Highway Maintenance & Construction Technology Research Center, University of California at Davis, pp. 1–11, (1999).

Feng, Kai–Ten et al.; "Look–Ahead Human–Machine Interface for Assistance of Manual Vehicle Steering," Proceedings of the American Control Conference, San Diego, California, pp. 1228–1232, Jun., 1999.

Tan, Han–Shue et al.; "A Steering Guidance System for Snowplow—An Interesting Control Problem," Proceedings of the 38th Conference on Decision & Control, Phoenix, Arizona, pp. 5114–5118, Dec., 1999.

Tan, Han–Shue et al.; "A Snowplow Steering Guidance System Using Roadway Markers—Problem Formulation and Solution Concept," University of California at Berkeley, Institute of Transportation Studies, 1357 South 46th Street, Richmond, CA 94804–4698, pp. 1–16, (1999).

Kittmann, Rolf; "Neural Mechanisms of Adaptive Gain Control in a Joint Control Loop: Muscle Force and Motoneuronal Activity," The Journal of Experimental Biology, pp. 1383–1402, (1997).

Tan, Han–Shue et al.; "Development of an Automated Steering Vehicle Based on Roadway Magnets—A Case Study of Mechatronic System Design," IEEE/ASME Transactions on Mechatronics, vol. 4, No. 3, pp. 258–272, Sep., 1999.

Motoshima, Kuniaki et al.; "Automatic Gain Control of Erbium–Doped Fiber Amplifiers for WDM Transmission Systems," IEICE Transactions of Communications, vol. E80–B, No. 9, pp. 1311–1320, Sep., 1997.

Kim, Myung Sup and Seong, Jin Suk; "Design and Analysis of an Automatic Gain Control Scheme for High–Speed Satellite Communications," IEICE Transactions of Communications, vol. E83–B, No. 1, pp. 99–102, Jan., 2000.

Feng, Kai–Ten et al.; "Future Predictor for Vehicle Steering Guidance—Sensitivity Analysis and Experimental Results," Proceedings of the 38th Conference on Decision & Control, Phoenix, Arizona, pp. 3722–3727, Dec., 1999.

Denno, Satoshi and Shirato, Yushi; "6.144Mbit/s Burst Modem with an Adaptive Equalizer for TDMA Mobile Radio Communications," IEICE Transactions on Communications, vol. E81–B, No. 7, pp. 1453–1461, Jul. 7, 1998.

Chen, Chieh and Tan, Han–Shue; "Experimental Study of Dynamic Look–Ahead Scheme for Vehicle Sterring Control," Proceedings of the American Control Conference, San Diego, California, pp. 3163–3167, Jun., 1999.

Choi, Selbum B., "The Design of a Look–Down Feedback Adaptive Controller for the Lateral Control of Front–Wheel–Steering Autonomous Highway Vehicles," Proceedings of the American Control Conference, Albuquerque, New Mexico, pp. 1603–1607, Jun., 1997.

Lasky, T.A.; Yen, K.S.; Ravani, B., "The Advanced Snowplow Driver Assistance System", Advanced Highway Maintenance & Construction Technology Research Center, University of California, Davis, pp. 1–8 (1999).

* cited by examiner

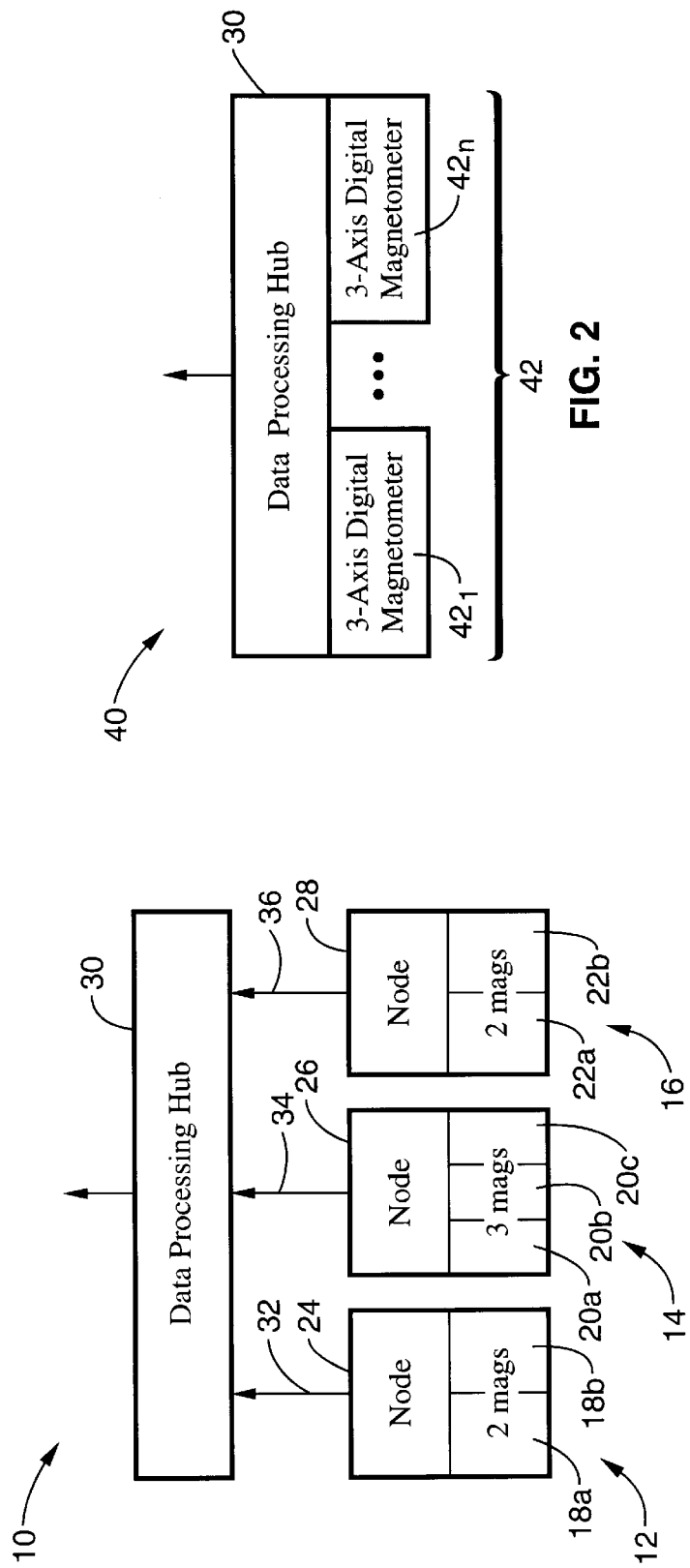

INTELLIGENT ULTRA HIGH SPEED DISTRIBUTED SENSING SYSTEM AND METHOD FOR SENSING ROADWAY MARKERS FOR INTELLIGENT VEHICLE GUIDANCE AND CONTROL

CROSS-REFERENCE TO RELATED APPLICATIONS

This application claims priority from U.S. provisional application serial No. 60/295,373 filed on May 31, 2001, incorporated herein by reference.

STATEMENT REGARDING FEDERALLY SPONSORED RESEARCH OR DEVELOPMENT

This invention was made with Government support under Contract No. RTA 65A0054, awarded by the Department of Transportation. The Government has certain rights in this invention.

REFERENCE TO A COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office files or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention generally relates to sensing roadway markers for driver assistance and vehicle control, and more particularly to an intelligent sensing system for sensing roadway markers for driver assistance and vehicle control.

2. Description of the Background Art

Over the years, numerous systems have been developed to provide automatic vehicle control to provide hands-free and feet-free driving of automobiles. These systems automate either steering control (referred to as lateral control), throttle and/or brake control (longitudinal control), or all of the above (complete vehicle automatic control, also referred to as an Automated Highway System or AHS).

Longitudinal control typically relies on some form of forward-looking sensor, e.g. radar, to provide collision warning and/or distance to preceding vehicles, and takes the form of either adaptive cruise control or platooning, wherein vehicles are formed into electronically coupled groups, similar to a train, but without the mechanical coupling. Lateral control relies on a variety of sensors to determine the vehicle's lateral offset from the lane centerline, and usually an estimate of upcoming roadway geometry, e.g. curvature.

Sensors for lateral control can be based infrastructure-based or infrastructure-independent. Examples of infrastructure-based systems include systems based on detection of embedded infrastructure, such as discrete magnetic reference markers or continuous magnetic tape. Infrastructure-independent methods include vision-based sensing and Global Positioning System (GPS) sensing; however, these systems rely on infrastructure in the sense of reliable roadway markings in the former case, and a reliable and accurate roadway Geographical Information System (GIS) database in the latter.

In recent years, systems have been developed using similar sensing technologies, but with the purpose of providing visual, audible, or tactile feedback and warning (i.e. driver assistance) to the driver of the vehicle, thus enhancing the driver's ability to operate the vehicle in degraded visibility conditions (e.g. in dense fog or snow-induced whiteout conditions). For these types of conditions, visual sensing for lateral control is not the ideal primary sensing system, as the performance of these systems is degraded in poor optical conditions. Infrastructure-based systems appear to provide the most reliable and robust solution for these conditions, particularly in areas that may be subject to satellite obscuration (e.g., mountainous regions). These systems also must include a forward collision warning system, as they are intended to enable the vehicle operator to drive in degraded visibility conditions, and must provide sufficient warning of upcoming obstacles, in order to protect this vehicle's driver, as well as others on the roadway.

There are several well-developed technologies for vehicle lateral guidance. They may be classified as vision-based, roadway reference system based, and radio wave signal based methods. Vision-based or other optical systems are generally considered inappropriate in poor visibility conditions such as fog, rain, and particularly snow. Roadway reference systems include induction wires, radar-reflective tape, magnetic tape, and discrete reference markers. Reference systems may be passive or active elements. Wire-guided vehicle control represents one active system; construction and maintenance issues preclude its use in a highway environment. Example markers include magnets, colored paint marks, retroreflective raised pavement markers, and radar-reflective materials. However, any optic-based marker detection system faces the same problem as any other vision-based system in low visibility environments; as such, these systems are not feasible here. Magnetic markers and overhead induction wires are possible all weather solutions for lateral guidance.

Magnetic markers for lateral control have been found to have a maximum lateral sensing error of 1.5 cm with 1 cm standard deviation, which is well within the 3 cm needed for commercially viable systems. Discrete magnetic markers embedded in the roadway can be used for longitudinal position measurement as well as lateral control. Moreover, magnetic markers can be coded with other roadway information, which each vehicle can read via onboard magnetometers. Each magnet is capable of storing one bit of information. The coded sequence consists of header code to initialize and uniquely identify the message, followed by the roadway information. Error detection codes can be placed at the end of the message as well. Magnetic pavement marker tape has been shown to have similar performance for lateral position measurement. However, it cannot be coded to provide roadway information. Furthermore, retrofitting magnetic tape to current highways may be difficult, and possibly more costly than installing magnetic markers; further study is warranted here. Nonetheless, concern has been expressed that magnetic markers may lead to temperature induced stress concentration and faster road deterioration. However, the maturity and robustness of the magnetic marker technology warrants its use in the current development for snowplow guidance. On the other hand, experience gained in recent research indicated other deficiencies in the state of the art in the magnetic sensing system.

For example, the use of continuous magnetic marking material to provide vehicle guidance and control is well known. However, such systems cannot provide information coding, and thus cannot provide upcoming roadway geometry (e.g. curvature), or other infrastructure information (e.g. upcoming bridge abutments). In addition, the algorithms used to detect the magnetic "tape" and determine lateral offset are typically based on the use of frequency and phase information, which assists in separating signal from noise, but cannot provide lateral offset down to zero vehicle speed. Furthermore, these systems appear to be limited to vehicle speeds of about five MPH and above. In addition, since these systems typically use a square-wave magnetization pattern to support the signal processing, at least one wavelength must be detected before lateral offset can be obtained; this introduces a signal processing delay of ½ wavelength.

Systems that employ discrete analog magnetometers suffer from a number of deficiencies as well. For example, information from the sensors (magnetic field strength) is transmitted to a central computer's data acquisition system over analog lines. This introduces serious noise issues in a vehicle environment. In addition, due to the large number of sensors and channels required, the conductor and part count is very high, leading to difficulties in installation, maintenance, and trouble-shooting. The high channel count also introduces the need for custom data acquisition and signal conditioning boards, further aggravating the problem. These and other issues make it difficult to protect subsystems against harsh environments (e.g., snow, ice, and salt). In addition, some of the algorithms used are subject to a number of problems. For example, typical algorithms rely on vehicle-specific calibration, and the calibration table is magnet-type or magnet-strength dependent, so that different calibration tables must be used for different areas of the roadway. While standard strength magnets are used to code much of the roadway, smaller yet much higher strength magnets are used to code bridges and other structures. In addition, the implementation uses fixed gain sampling, which reduces effective use of sensor range, and introduces unnecessary saturation. Furthermore, these algorithms are based on peak detection and, therefore, cannot operate down to zero vehicle speed. This creates significant problems at low speeds. In addition, vehicle lateral offset is provided only at instances of peak detection (i.e. when the vehicle's sensor system is directly over the magnets as it travels along the road). This means that the sensor update rate is dictated by magnet spacing combined with vehicle speed. This update rate should be independent of these factors, and should only be dictated by the requirements of the control or driver assistance system. In addition, such systems do not lend themselves to miniaturization in their current form, as they require a centralized industrial computer, custom I/O boards, and the resultant relatively large supporting power and mechanical infrastructure. Furthermore, these systems tend to lack the modularity, robustness, and maintainability necessary for a deployed commercial system.

Thus, it is desirable to have a lateral sensing system that uses digital transmission for safety-critical data, such as lateral offset, magnet field strength data, and other critical sensing information. Digital transmission resolves the vehicle noise issue, as well as reducing cabling requirements and easing installation, diagnosis, and maintenance. The resultant system will also be more robust to harsh environmental conditions. In addition, it is desirable, in the case of magnetic material sensing, to minimize or remove sensitivity to absolute magnetic field strength as well as sensor height. A system that avoids use of peak detection is also desirable, in that it allows the sampling rate to be selected based on the requirements of the control system, independent of magnetic marker spacing and vehicle speed. By avoiding peak detection, and appropriately designing the overall system, it is also possible to develop a sensor that can perform down to zero speed, and over the full range of possible vehicle operating speeds. Algorithms used in the system should be insensitive to magnet strength variation, ride height variation, and vehicle speed. Also, the system should limit exposure to sensor saturation while maximizing the available sensing range and maximizing use of available data representation. In addition, a system that can support both discrete and continuous magnetic reference systems will be of broad appeal for end users and infrastructure providers. The present invention satisfies those needs, as well as others, and overcomes deficiencies in current technology.

BRIEF SUMMARY OF THE INVENTION

The present invention generally comprises methods and apparatus to sense both discrete and continuous magnetic reference systems installed in the roadway, and provide information to support lateral and, to some extent if necessary, longitudinal and vertical vehicle control and/or driver assistance. More particularly, the invention comprises an intelligent sensing architecture and an assortment of methods for deriving lateral (across road), longitudinal (along road) and vertical offset (above road), and other pertinent information, from both continuous and discrete magnetic reference systems.

By way of example, and not of limitation, the invention comprises a method and apparatus for determining the position of an object relative to a magnetic reference marker by sensing, with a sensor associated with the object, at least one axial field strength component of the magnetic field emitted from the magnetic reference, computing a ratio of the sensed axial field strength components, and then determining the positional offset of the object from said magnetic reference as a function of the ratio. Preferably, the magnetic reference comprises an infrastructure that defines a roadway reference line, and the positional offset comprises lateral offset from the roadway reference line.

The ratio provides a one-to-one mapping of the sensor outputs to lateral offset. The output of this mapping for selected values of X (longitudinal offset) yields a surface that can be sliced for different values of vertical offset Z to produce a domain map from which the lateral offset can be determined. The lateral offset, which is independent of the magnetic reference field strength due to the use of the ratio approach, is then determined from the domain map. Points along the domain map which are between sample points can be determined by interpolation or curve fitting. These functions are carried out preferably using a digital data processor and associated programming.

The invention is usable over a wide range of vehicle operating speeds, such as from zero to 150 MPH. The signal processing methods of the present invention are insensitive to magnet field strength variation, vehicle ride height variation, and vehicle speed. Embodiments of the invention provide noise immunity, robustness, manufacturability, portability, low cost, superior environmental operation, modularity, compactness, installation, diagnostics, and maintenance.

The invention can be used for a wide variety of applications, including, but not limited to, vehicle guidance and control, driver assistance, robotics, position determination of objects, location finding, depth finding, and other applications where relative position from a magnetic reference point is useful. Additionally, the invention is useable in a wide range of operating environments, including those subject to severely degraded visibility and harsh environmental operating conditions, such as blizzard, fog, and whiteout conditions.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a functional block diagram of an embodiment of a non-monolithic intelligent sensing architecture according to the present invention.

FIG. 2 is a functional block diagram of an embodiment of a monolithic intelligent sensing architecture according to the present invention.

DETAILED DESCRIPTION OF THE INVENTION

Figure 53:
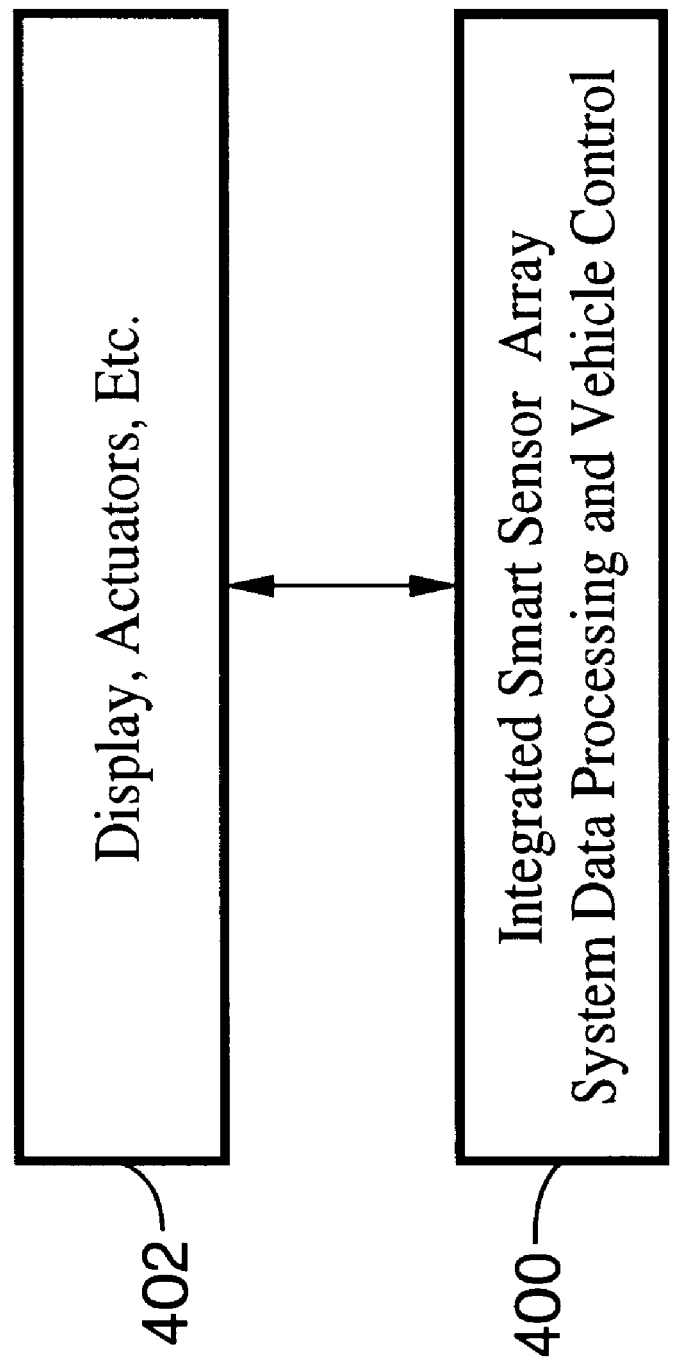
FIG. 53 is a functional block diagram of an embodiment of a monolithic smart sensor array and system processing configuration according to the present invention.

Referring more specifically to the drawings, for illustrative purposes the present invention is embodied in the apparatus and methods generally described in FIG. 1 through FIG. 53. It will be appreciated that the apparatus may vary as to configuration and as to details of the parts, and that the method may vary as to the specific steps and sequence, without departing from the basic concepts as disclosed herein. Note that while the description refers to "roadway" and "pavement," and that the invention was developed in the context of highway applications for assistance and control, the present invention is not limited to such applications specifically. Therefore, the terms "roadway" and "pavement" should be interpreted in a general sense as a planar surface upon which vehicles or other moving objects can travel. In this context, the present invention can be used in other specific application domains, including airport runways, industrial warehouses, cargo loading areas in shipyards, parking lots, transit bus docking zones (for handicapped loading compliance), manufacturing plants, fleet maintenance yards, and any other similar application in which a vehicle moves along a predetermined path. In its most general form, the invention can provide three-dimensional positioning relative to a magnetic reference.

1. Introduction.

In general terms, the present invention is a system for sensing roadway markers for use in intelligent vehicle mobile guidance and control. The system provides an intelligent ultra high speed distributed digital sensing architecture. This sensing architecture can be used in driver assistance systems (e.g., snowplows and other vehicles operating in low visibility conditions, such as fog, dust, blizzards and whiteout conditions) and in fully automated lateral vehicle control (e.g. automated highway systems).

The system comprises an array of multi-axis magnetometers, aggregated into nodes if desired, and an intelligent data processing hub comprising, for example, a digital data processor and associated programming, which acquires data from all nodes, processes all magnetometer data, and provides information pertinent to vehicle guidance and/or control. Such information can include, but is not limited to, vehicle lateral offset from a roadway reference line (e.g. centerline) as delineated by magnetic infrastructure (such as discrete magnetic reference markers or continuous conformable magnetic tape), coding information provided by the marker polarity of this magnetic infrastructure (e.g. upcoming roadway curvature), vehicle longitudinal speed, vehicle heading, and absolute vehicle location (e.g. milepost or landmark). The system maximizes sensor range through use of coordinated Adaptive Gain Control (AGC) across all magnetometers. Alternative sensors are supported by the intelligent sensing architecture, so that the invention is not limited to magnetic infrastructure, and can support radar sensors for collision warning, as well as, for example, beacon-based approaches using wireless location beacons. The system also will support incorporation of a Global Positioning System (GPS) input, which can facilitate use of location-specific data (e.g. roadway curvature) via an on-vehicle database when using infrastructure that is not suited to providing such data. Advantages of the architecture include robustness, ease of installation, reduced cabling requirements, noise immunity, reduced cost, modularity, small size, and maintainability, all of which indicate that the system provided by this invention leads to a commercially viable system for use in a wide variety of vehicle guidance and control applications.

2. System Function.

The primary function of the system is to sense both discrete and continuous magnetic roadway reference systems, and determine lateral offset in a continuous manner, in support of both driver assistance (or guidance) and full vehicle control. The system can also provide secondary functions that are dependent upon the type of infrastructure being sensed (i.e., continuous or discrete) and which may also be application-specific. Such secondary functions include providing magnetic polarity (useful for information coding), frequency (markers per second for discrete, square wave for continuous), speed estimation, phase information, and others, as required in a given application. The system can also provide an intelligent sensing hub, incorporating other vehicle sensors including radar, GPS, and data available from any on-board vehicle bus or sensor. In such a function, the intelligent hub can process all available sensing information in a manner appropriate for the given application (control, driver assistance, etc.).

The system's target application or domain of operation is for driver assistance (or guidance), driver warning (e.g. lane departure), and partial or full vehicle control. Possible applications include, but are not limited to, driver assistance for snowplow operations in whiteout conditions, driver assistance for other vehicle types in low visibility conditions (low-light, fog, dust, rain, etc.), full vehicle control for certain specialty vehicle applications (e.g. rotary snow blower full lateral control), lane departure warning for commercial vehicle operations (CVO), low-speed precision guidance for vehicle docking applications including precision bus-docking for handicapped loading, as well as precision docking for freight loading, and in the long-term future, full vehicle control for passenger and other vehicle types.

3. System Architecture.

The system architecture is flexible, and can be configured in a number of different ways. The system architecture represents an intelligent system, and supports a wide variety of configurations such as monolithic, distributed, satellite, mixed (or hybrid), longitudinal sensor array, intelligent sensor hub, full vehicle controller, etc.

In one preferred embodiment, shown in FIG. 1, the system 10 comprises several arrays of multiple-axis (up to three axes) digital magnetometers. Each array can comprise multiple magnetometers. In the embodiment shown in FIG. 1, there are three arrays 12, 14, 16. Array 12 comprises two magnetometers 18a, 18b; array 14 comprises three magnetometers 20a, 20b; and array 16 comprises two magnetometers 22a, 22b. Each array 12, 14, 16 provides field strength readings in digital form for all available axes, and communicates these strength readings to a corresponding "node" 24, 26, 28 which aggregates the field strength readings into a digital stream. Each node 24, 26, 28 is connected to an intelligent digital data processing hub 20 through corresponding connections 32, 34, 36. Digital data processing hub 20 typically comprises a digital data processor and associated programming to implement the functions described herein. The connections can be through co-axial line, twisted pair cable, fiber optic, or any other means of communicating a digital data stream, including wireless means. The intelligent hub 30 extracts all field strength readings from each node 24, 26, 28, uses identifiers to map field strength readings to sensor locations, and processes the signal strengths to obtain lateral offset and other information, using the methods (algorithms) discussed below. The particular algorithm selected is based on sensor configuration as well as current sensing conditions. Hub 30 then communicates lateral offset and other sensed information (e.g. polarity, frequency, etc.) to another system or device which can use this data to support driver assistance or full vehicle control.

The configuration shown in FIG. 1, which may be referred to as distributed or hybrid, is but one possible configuration among many, and is not intended to limit the scope of the invention. Rather, it is intended to provide a specific example to clarify general concepts, and provide a context for illustrative purposes. Many other configurations are possible, depending on a given application or vehicle type. For example, FIG. 2 shows an alternative system configuration 40. Here, for the appropriate application, a single integrated array 42 of multi-axis (up to three per magnetometer) magnetometers $42_1$ through $42_n$ is combined with the intelligent digital data processing hub 30, with all elements combined in a single unit. Such a configuration may be referred to as monolithic. In this configuration, the digital magnetometers may communicate directly with the intelligent digital data processing hub. Note that in this configuration the so-called "nodes" of FIG. 1 which aggregate digital signals for transmission over appropriate communications medium, as well as the associated communications medium, have been eliminated. As a result, the architecture is collapsed into a single physical unit.

Figure 3:
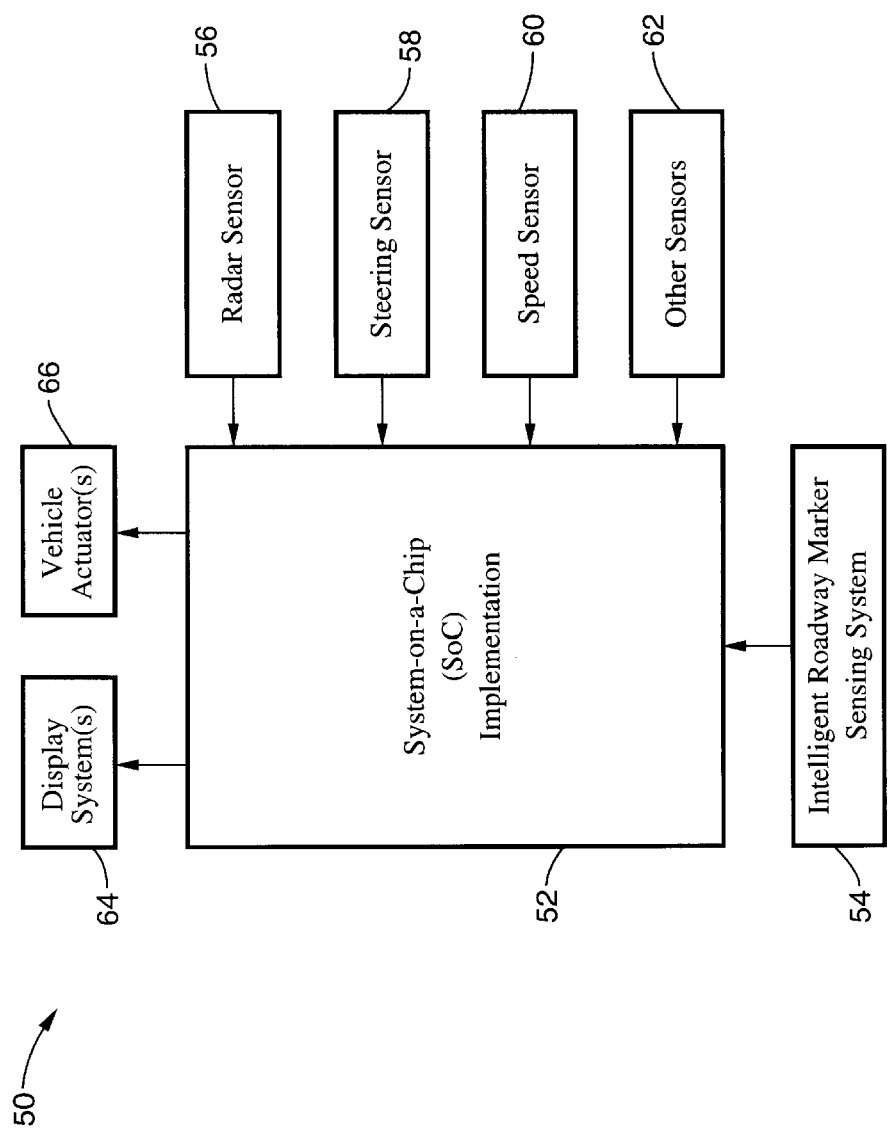
FIG. 3 is a functional block diagram of a vehicle control system employing an intelligent roadway marker sensing system according to the invention.

Referring now to FIG. 3, an example of how the intelligent roadway marker sensing system of the present invention can be integrated with hardware for either driver assistance or full vehicle control is shown. In the integrated control system 50 of FIG. 3, centralized intelligence is provided by a system-on-a-chip (SoC) implementation 52. Depending on the application, the intelligent roadway marker sensing system block 54 may include all digital data processing within its own subsystem (e.g., as in FIG. 1 or FIG. 2), or, preferably, the intelligent digital data processing hub 30 could be contained within the SoC component 52 (in which case the SoC component 52 would be considered part of the intelligent sensing hub).

Specific processing components chosen for implementation are not critical in any of these configurations, however, so long as they provide the required processing capabilities. Preferably, intelligent digital data processing hub 30 and/or SoC component 52 would be implemented using Field-Programmable Gate Array (FPGA) architecture. However, other embedded technologies could be used, including Programmable Read-Only Memory (PROM), EPROM, EEPROM, Application Specific Integrated Circuit (ASIC), or other embedded computing technologies. Alternatively, centralized processing could be performed using a single industrialized or embedded computing system, rather than a system-on-a-chip approach.

In the example of FIG. 3, the integrated control system 50 implements the lateral sensing function provided by the intelligent roadway marker system 54 of the present invention in combination with other components necessary or desirable for driver assistance and/or full vehicle control. For example, control system 50 could include a radar sensor 56 to detect obstacles ahead of the vehicle, a steering sensor 58, a speed sensor 60, and optional other sensors 62 (e.g., GPS, inertial measurement unit, etc.). Control system 50 can further include one or more display systems 64 for driver assistance and one or more vehicle actuators 66 (e.g., steering, throttle, brake) for partial or full vehicle control. If multiple displays 64 are employed, associated switching means may also be provided for display selection. Note that the term "display" is used generically herein to denote various forms of visual display, audible presentation, or even haptic feedback. Again, the hardware components 52 and 56 through 66 themselves are conventional and do not individually form a part of the invention. The invention is embodied in the intelligent roadway marker sensing system 54 and its overall implementation in control system 50.

In the preferred embodiment, SoC 52 preferably contains all logic required to support the required functions including the functions of intelligent digital data processing hub 30. All processing and operation is implemented on a chip, rather than an industrial computer. Additionally, all data processing and analog-to-digital conversion is performed at the sensor level, so that all data transmission can be digital, thus alleviating noise infiltration. This preferred embodiment offers superior environmental operation, modularity, ease of installation, self-diagnostics, maintainability, portability, and size. The modularity of the design allows support for a wide variety of sensor and actuator configurations. In addition, components of the system can be developed in a way that they are self-diagnosing, and that allows for easy troubleshooting and replacement in the field. These features, and others, lead to a system with excellent commercial prospects.

Figure 4:
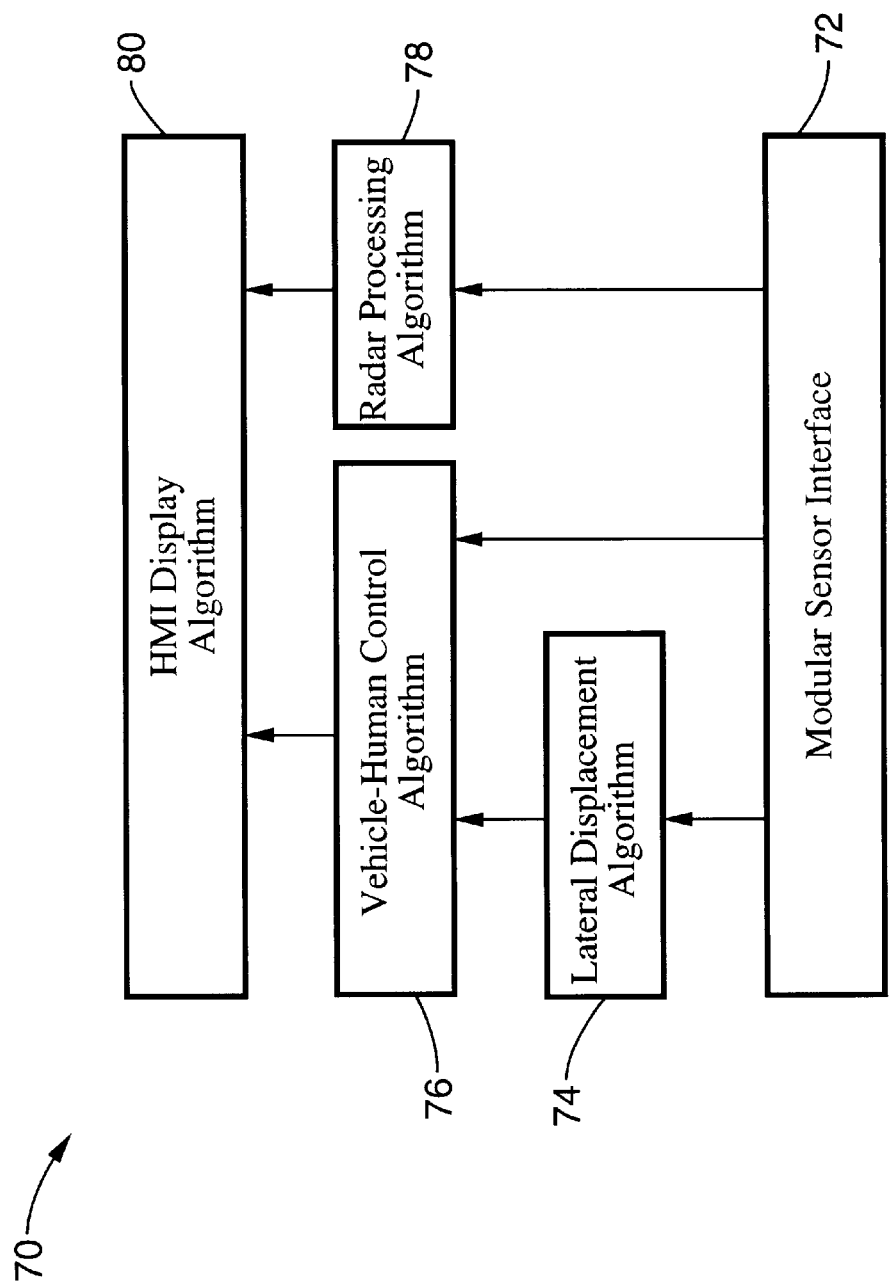
FIG. 4 is a functional block diagram of an embodiment of a system-on-a-chip implementation of an intelligent roadway marker sensing system according to the invention.

Referring now to FIG. 4, an example architecture 70 for SoC 52 is shown. A modular sensor interface 72 is provided to receive input from the various sensors shown in FIG. 3, including the magnetometers in the sensor portion of intelligent roadway marker sensing system 54. The functional aspects of the invention, which are implemented by execution of algorithms, are grouped into functional blocks such as the lateral displacement algorithm block 74, vehicle-human control algorithm block 76, radar processing algorithm block 78 and HMI display algorithm block 80 shown. This approach allows easy integration of various functions, provides an upgrade path, and quick time-to-market. This type of architecture is well-suited for SoC implementation, and particularly to implementation with FPGA technology. It can also lead to a compact implementation, with low-cost and low-power requirement, yielding a system well-suited to for commercial product.

4. Signal Processing.

Figure 5:
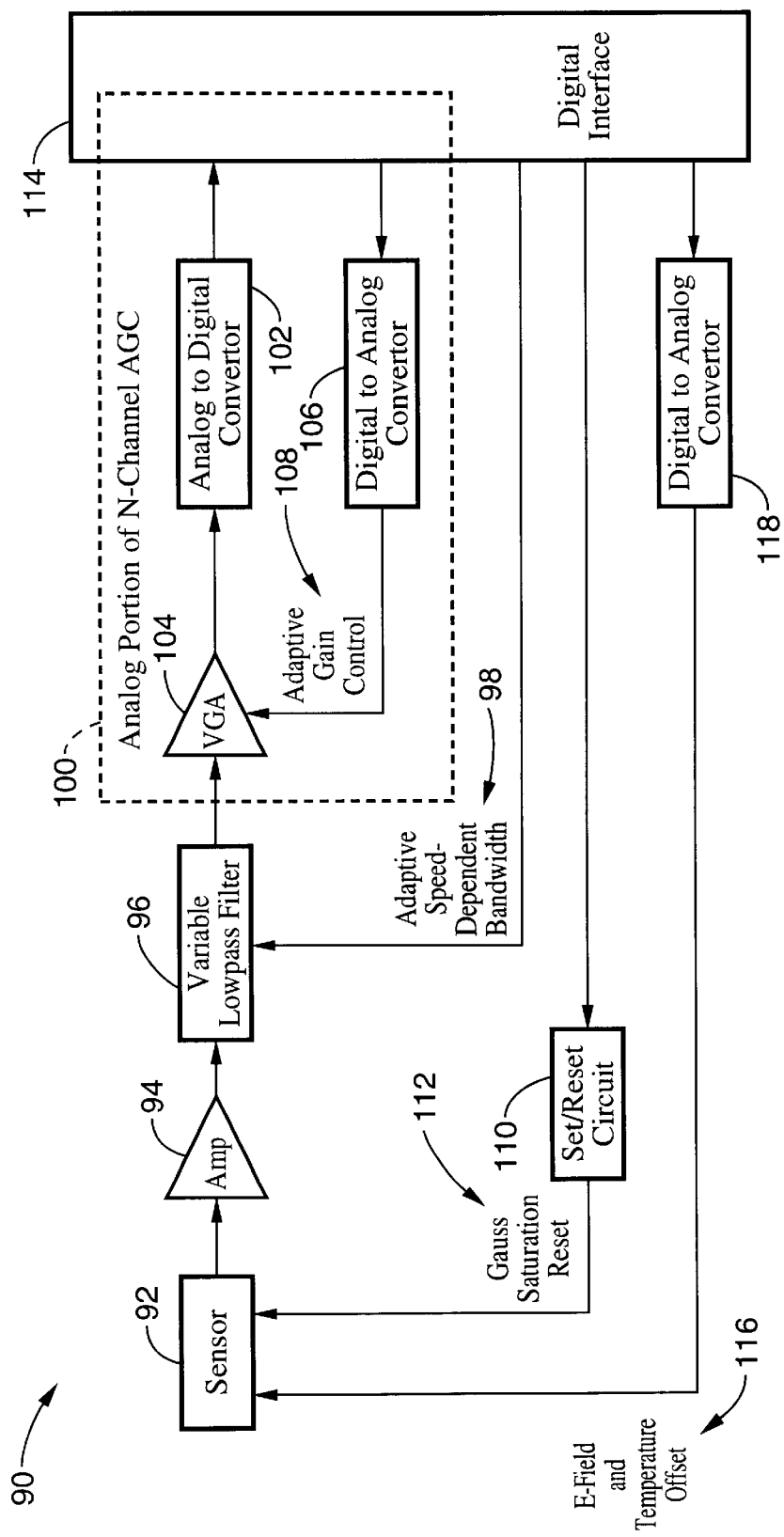
FIG. 5 is a functional block diagram of an embodiment of a magnetometer configuration according to the present invention, with only one axis being depicted.

FIG. 5 depicts a single axis 90 of a given magnetometer within the overall system. The specific magnetic sensing element 92 may be based on a variety of technologies, including flux-gate, Hall effect, etc. In the preferred embodiment, sensing element 92 comprises a magnetoresistive sensor. The input signal is amplified by an amplifier 94 and passed through a low-pass filter 96 in order to remove some aspects of noise from the system. The bandwidth of filter 96 is adjustable through adaptive bandwidth feedback 98 to accommodate vehicle speed and other requirements, thus optimizing the use of bandwidth while minimizing noise components.

The system also employs Adaptive Gain Control (sometimes referred to as Automatic Gain Control) circuit, or AGC, to improve signal processing. As used herein, AGC refers to a means of adjusting the amplifier gain in the sensor based on signal conditions. FIG. 5 shows a basic analog AGC circuit 100 where a portion of the digital signal output from analog-to-digital converter 102 is fed back to a variable gain amplifier 104 through a digital-to-analog converter 106 to provide adaptive gain control 108. By dynamically adjusting the gain based on signal conditions (e.g. strength), the use of the analog-to-digital converter dynamic range can be maximized for a given number of data bits. This allows for optimal dynamic range utilization and thus allows use of a smaller number of bits, with resulting decrease in analog-to-digital converter width, and improvement in system bandwidth usage.

A set/reset circuit 110 is also provided for a Gauss saturation 112 reset of sensor 92. Note also that, in the preferred embodiment, the signal is digitized at the bar level through analog to digital converter 102 before being sent to either a "node" or directly to the intelligent sensor hub through a digital interface 114. In other embodiments, the signal may be sent in analog form to a central computer or other processing device; however, such embodiments would not have many of the advantages of the preferred embodiment.

Figure 6:
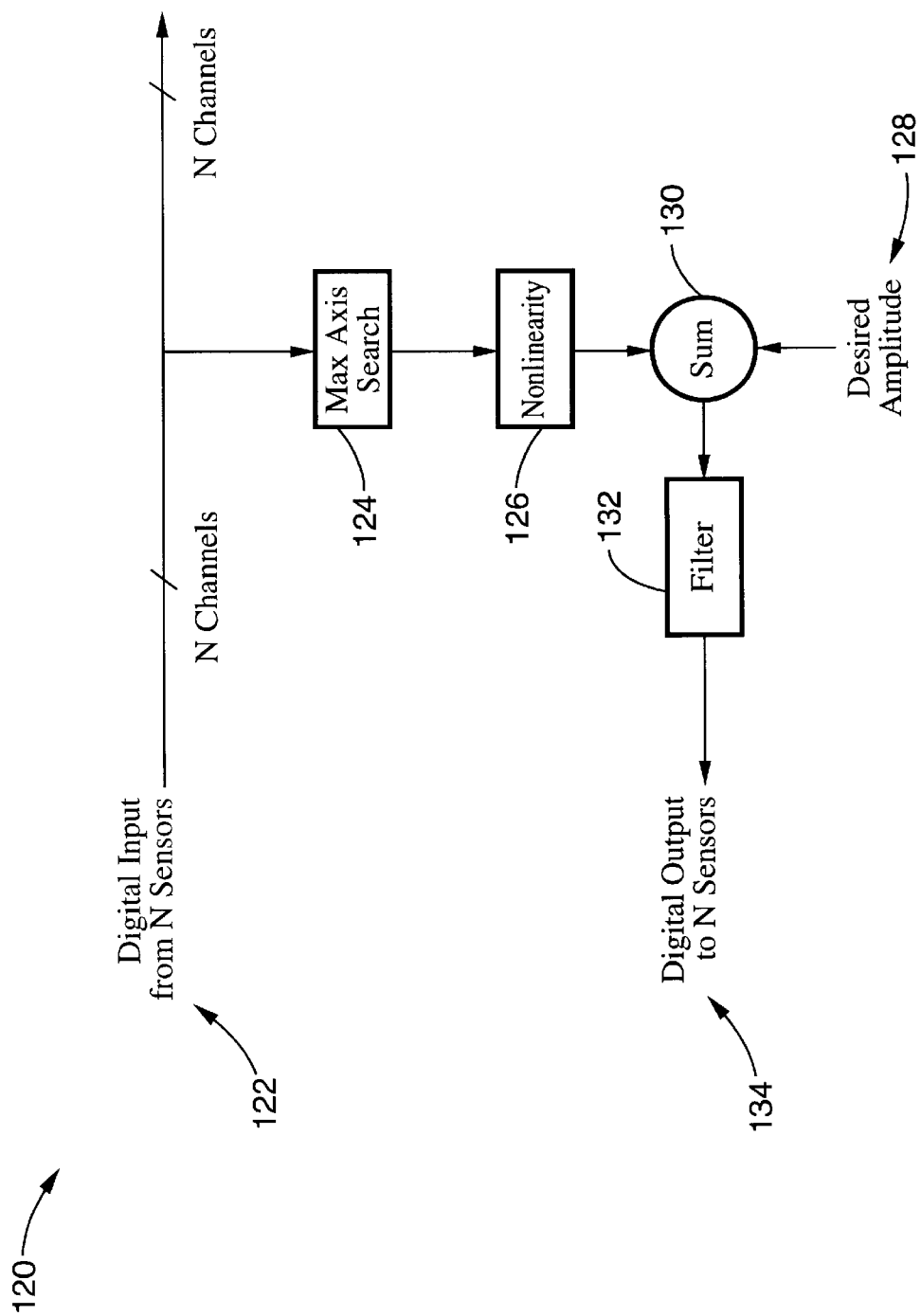
FIG. 6 is a functional block diagram of an embodiment of an N-channel digital automatic gain control according to the present invention.

The preferred embodiment of the system also includes adaptive gain feedback 116 to sensor 92 through a digital to analog converter 118 to remove the effects of both Earth field (E-field) and temperature effects on the sensor. This is accomplished using digital AGC as depicted in FIG. 6 where an N-channel digital AGC 120 is shown. AGC 120 takes the digital input 122 from N sensors, performs a maximum axis search at block 124, adjusts for nonlinearity at block 126, sums the output of the nonlinearity stage with a desired amplitude signal 128 in a summer 130, and then passes the sum through a filter 132 to provide a digital output 134 to the N sensors.

It will be appreciated that a system based on magnetic reference markers, whether discrete or continuous, is subject to a number of noise sources and types. Noise sources include ferromagnetic items in the roadway (e.g. support rebar), ferromagnetic sources in the vehicle (e.g. the chassis), electromagnetic sources in the vehicle (e.g. alternator), and the magnetic field of the Earth itself, also referred to as either the geomagnetic field, or the "Earth field" (E-field). Roadway noise sources can be difficult to address and distinguish from the magnetic marker systems, depending on the type of marker system and the noise source. However, because the invention greatly improves the overall quality of the signal, it can also facilitate distinction of the actual signal (reference system) from roadway noise. Static ferromagnetic vehicle sources can be easily removed either through calibration, or, preferably, as part of the static field removal process in signal processing. Non-static electromagnetic vehicle sources can be more problematic, but as long as such noise sources are located sufficiently far from the sensing system, this problem will not be insurmountable. The Earth field can be, in general, sensed as a slow-changing (based on vehicle direction) signal, and can be appropriately removed as part of the sensor signal processing.

In addition, in the preferred embodiment, the background semi-static noise signal (from the Earth field and/or the static vehicle fields) is subtracted from the sensed signal prior to reaching amplifier 94. In this way, the signal passed through amplifier 94 and subsequently digitized and processed, already has this low-frequency noise component removed. Since the low-frequency noise component can be relatively large, removing it prior to amplification of the sensor signal greatly improves usage of the magnetometer sensor range, as well as the dynamic range of the communications channel.

5. Lateral Offset Determination Method.

The lateral offset determination method of the invention, variations of which (i.e., algorithms) are discussed below, also provides a number of advantageous features such as magnetic strength independence, ride and sensor height insensitivity, longitudinal position insensitivity, and independence from field strength signal peak detection, so that the sampling frequency can be selected independent of vehicle speed or magnetic marker spacing (for discrete markers). Using these algorithms in digital data processing hub 30 or SoC 52, as the case may be, the system provides required data in a manner which is insensitive to vehicle ride and bounce height, magnet strength variation, and vehicle speed. The system is also capable of providing data from vehicle speeds ranging from zero to 150 MPH; that is, the system will function down to a standstill, which allows automation of very low-speed operations such as bus docking for support of loading for disabled passengers.

The following algorithms, in combination with the sensor signal processing architecture and method described above, provide accurate lateral offset of the vehicle independent of magnetic strength, dynamic ride height, and velocity. In addition, the algorithms have the ability to calculate lateral offset before or after the reference marker passes under the sensor (i.e., not merely when directly over the magnet). Note that, in the description of the algorithms that follows, reference will be made to "left" and "right" sensors. This refers to the pair of magnetometers closest to the magnetic reference, with the "left" magnetometer closer to the driver's side of the vehicle. Some algorithms may have the option of using the adjacent sensor in order to increase sensitivity; this adjacent sensor refers to the next closest sensor to the one that needs to be replaced due to poor sensitivity conditions. In general, however, the domain of applicability for the algorithms is with the magnetic reference between a given pair of sensors. When the magnet is within this region, exception cases such as a denominator equal to zero are not possible. Special case handling for sensing of magnets that do not fall within this domain is beyond the scope of the algorithms described herein.

5.1 Methodology.

The algorithms of the present invention are based upon application of what is known in the art as "dimensional analysis". Application of this methodology allows automatic generation of dimensionless parameters, which facilitates identification of alternatives for deriving the information of interest (lateral offset, etc.). The methods selected all provide independence of magnetic reference marker strength, as the resulting formulas are ratios of fields, and the magnetic strength is canceled out. In addition, the approaches rely on the use of a domain mapping to map the field strength ratio value in a one-to-one manner to the desired lateral offset information. The domain of applicability for the various approaches is dependent upon sensor configuration and geometry, which is the motivation for deriving all available sensing and algorithm combinations. Note that the approach can provide more algorithms than are shown herein, and that the representative combinations are provided for illustrative purposes.

Areas of applicability are selected in part based on the characteristics of each algorithm's specific domain mapping, particularly based on areas of maximum height-independence and insensitivity, along with their appropriateness for a particular sensor configuration. In addition, the approaches here are selected to be independent of the vehicle's location along the roadway in the sense that the algorithms do not depend upon peak detection, and thus the algorithms allow selection of signal sampling in a manner that is independent of vehicle speed and magnetic marker spacing (for discrete magnetic markers). This factor also allows for operation down to zero speed, which is an improvement for both discrete and continuous marker sensing systems. This approach varies from known approaches, and represents an important aspect of the invention.

5.2 Assumptions.

All of the lateral offset algorithms assume no vehicle roll or yaw. The algorithms will tolerate small roll or yaw. In particular, large roll angles will be a concern.

5.3 Sample Points.

Algorithms must be detectable (i.e., they must be within range of the magnet). These algorithms can provide offset down to zero vehicle speed.

5.4 Sensitivity.

Many of the algorithms provide a non-linear solution for the lateral offset. As such, the sensitivity at various offsets is not constant. It is possible to compensate for non-linear sensitivity weaknesses by flipping the solution with respect to the y-axis. The offset can be calculated from the translated algorithm or calculated from the average lateral offset between the translated and non-translated algorithms. This will then allow for the greatest sensitivity near a sensor. For example, if the sensitivity needs to be increased at SensorSpacing/2, then the system can perform the algorithm between non-adjacent sensors in order to provide the highest sensitivity for the area in question. Here, "SensorSpacing" represents the space between two adjacent magnetometers.

It is possible to dynamically select these algorithmic variations based on sensed conditions. Note, however, that an advantage of the invention is that it is generally insensitive to magnetic strength changes as well as height changes (e.g., bounce) of the vehicle.

5.5 Coordinate System.

For convenience, position coordinates are indicated by (x, y, z), while magnetic field readings are designated by B, with individual field components represented by subscript (i.e., $B_x$, $B_y$, $B_z$). An additional subscript is used to represent the specific sensor (e.g., $B_{xleft}$; $B_{xright}$; $B_{yleft}$; $B_{yright}$; $B_{zleft}$; $B_{zright}$). Here, the x-axis is along the direction of vehicle travel in general, and along the longitudinal axis of the vehicle specifically. The y-axis is across the roadway in general, and across the lateral axis of the vehicle specifically, where the -y direction is towards the driver side of the vehicle and the +y direction is towards the passenger side of the vehicle. The z-axis is perpendicular to the roadway surface in general, and parallel to the vertical vehicle axis specifically. Using a right-hand coordinate system, the z-axis would point downward.

Determination of lateral offset is the primary goal of the algorithms. For convenience, lateral offset is considered to be relative to the left sensor. The offset is then shifted (i.e., calibrated) to correspond to the offset from the center of the vehicle.

Algorithms are classified based on the number of axes per sensor (single, dual, or triple). Note that it is possible to use dual-sample algorithms with samples symmetric about the magnet (i.e. at $\pm x_0$); however, such approaches can be replaced by simpler (in terms of actual implementation) single-sample algorithms that are mathematically equivalent. Other algorithms are possible, but do not provide the advantageous characteristics desired here, namely magnetic strength, dynamic ride height, and velocity independence.

The majority of the algorithms are presented in the context of detecting a single magnetic dipole, as used in discrete magnetic marker reference systems. However, because the algorithms are independent of the form of the field equations, and continuous magnetic marking material can be modeled by a superposition of magnetic dipoles, some of the discrete algorithms presented may also apply for continuous magnetic reference sensing, with the appropriate revision of the nonlinear domain map. Algorithms that are specific to continuous magnetic reference systems are separately described.

Table 1 and Table 2 summarize the various discrete and continuous marker lateral offset detection algorithms. Here, "exceptions" refers to conditions for which the specific algorithm is not valid; at or near these exceptions, the system automatically selects a more appropriate algorithm or sensor, or uses an inverse formula and mapping.

6. Discrete Magnetic Marker Lateral Offset Algorithms.

6.1 Single-Axis, Y-Axis Configuration.

Figure 7:
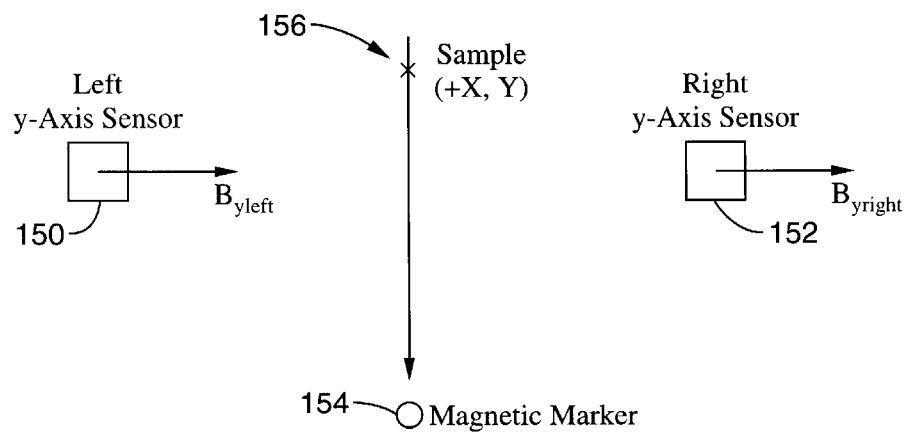
FIG. 7 is a schematic diagram of a top plan view an embodiment of a single-axis, y-axis sensor configuration according to the present invention.
Figure 8:
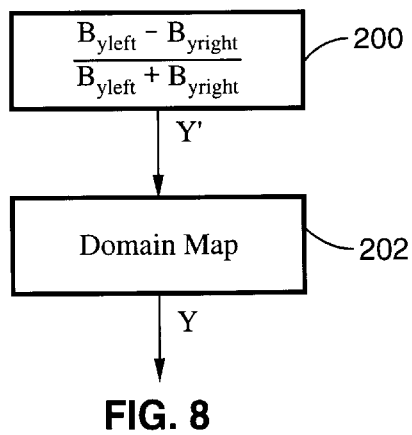
FIG. 8 is a flow diagram of an embodiment of a method for determining lateral offset using the sensor configuration shown in FIG. 7.

FIG. 7 depicts a schematic layout of left 150 and right 152 y-axis sensors in relation to a magnetic marker 154 and a sample location 156. FIG. 8 depicts a corresponding algorithm for determining lateral offset in this single-axis, dual sensor, y-axis configuration. The algorithm shown in FIG. 8 may be used to sample the magnetic marker B-Field at any detectable location. At step 200, the field strength ratio F[$\vec{B}_{left}, \vec{B}_{right}$] is determined as:

$$F[\vec{B}_{left}, \vec{B}_{right}] = \frac{B_{yleft} + B_{yright}}{B_{yleft} - B_{yright}} \quad (1)$$

-continued where $$\vec{P} = \begin{pmatrix} x \\ y \\ z \end{pmatrix}, \vec{B}_{left}(\vec{P}) = \begin{pmatrix} B_{xleft}(\vec{P}) \\ B_{yleft}(\vec{P}) \\ B_{zleft}(\vec{P}) \end{pmatrix}, \text{ and } \vec{B}_{right}(\vec{P}) = \begin{pmatrix} B_{xright}(\vec{P}) \\ B_{yright}(\vec{P}) \\ B_{zright}(\vec{P}) \end{pmatrix}.$$

Note that this equation for F is a dimensionless ratio, which is desired for determining lateral offset. This ratio will provide a one-to-one mapping of the sensor outputs to lateral offset Y. The output of this mapping for specified values of X and Z (longitudinal and vertical offsets, respectively) is denoted by Y'.

For example, assume the following:

(a) Sensor Configuration Parameters (based on specific application):

SensorSpacing=0.30 meters; and

RideHeight=0.50 meters, where RideHeight is the mounting height of the sensors.

(b) Magnetic Field Parameters:

$\mu = 4\pi 10^{-7}$(Wb m)/A; and $M = 8.0 \times 10^4$(A m$^2$);

where $\mu$ is for free space. Air is very close to this value (up to about 7 significant figures). The value for M is based on the 4-stack magnet used in practice in the road, everywhere except on bridges and similar structures. This value is determined empirically (with field measure Bz=2.0 Gauss at x=0, y=0, z=0.20 m) by substitution into the B-Field equation and solving backward for M. Note also that these parameters will always divide out in the field equation ratios, so they are essentially irrelevant in connection with the algorithm. However, these values do need to be considered in connection with hardware implementation issues such as signal-to-noise ratio, as well as absolute signal strength. Note that these magnetic field parameters apply to all instances of the determination of offsets using discrete magnetic markers described herein.

(c) B-Field equation based on magnetic dipole model:

$$By[x, y, z] = \frac{\mu M}{4\pi\left(\sqrt{x^2 + y^2 + z^2}\right)^5}(3yz). \quad (2)$$

Figure 9:
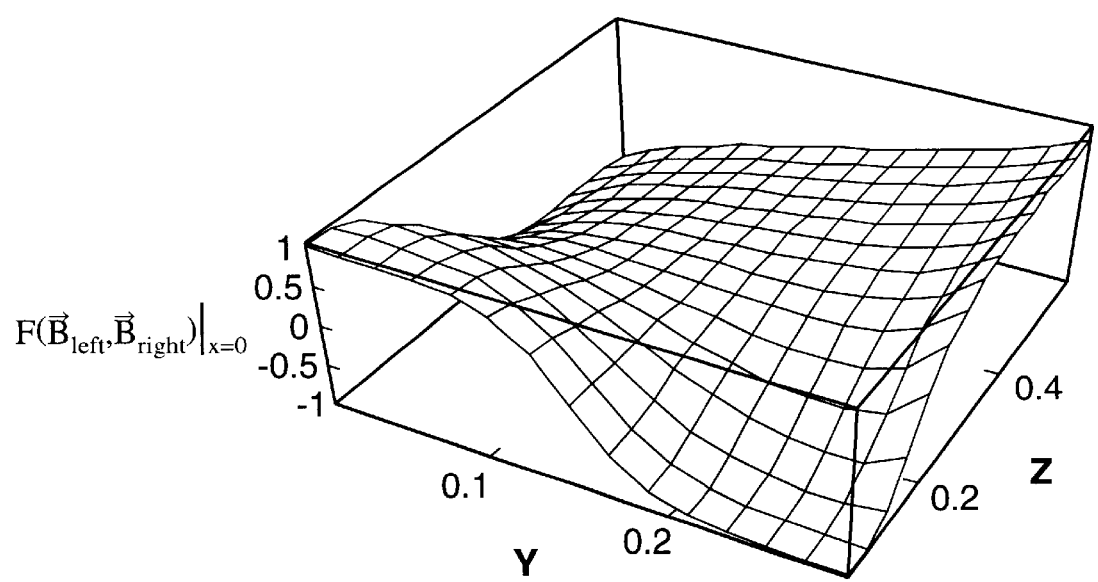
FIG. 9 is an example of a three-dimensional B-field plot corresponding to the sensor configuration shown in FIG. 7 and method for determining lateral offset shown in FIG. 8.

For the given sensor spacing, FIG. 9 depicts the ratio F($\vec{B}_{left}, \vec{B}_{right})|_{x=0}$ of the B-Field function. Note that we selected one of the coordinates as fixed in order to visualize the resulting surface; namely, for a fixed value of X=0 (i.e. right over magnet along roadway). This yields a surface that can be sliced for different values of the vertical offset Z. Preferably, the value of Z is chosen so that the slice will be in a relatively flat area of the surface shown in FIG. 9. This reduces the sensitivity to Z variation in calculating lateral offset Y from a fixed Z value. In this example, the value of Z=0.5 meters was chosen.

Figure 10:
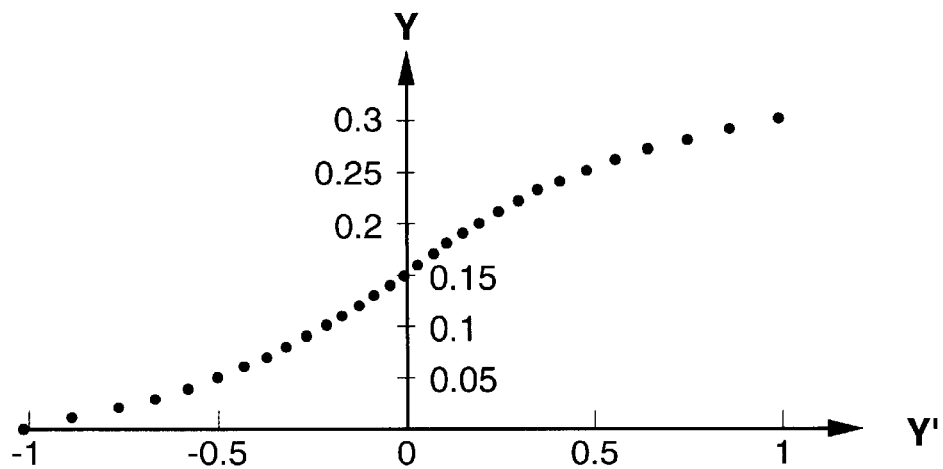
FIG. 10 is an example of a domain map generated according to the method shown in FIG. 8.

At step 202, the surface is sliced as described above to produce a domain map from which the lateral offset Y can be determined as shown in FIG. 10. The map as defined can be implemented in a number of ways, and the actual implementation may take into account accuracy requirements, processing speed, processor memory, and other factors based on a given application. The preferred, and most straightforward way, is to sample the surface at a fixed value of Z as described and use interpolation or a simple polynomial curve fit to approximate values between samples. It will be appreciated, however, that instead of sampling the surface as described, the entire surface could be programmed into a map for computation of lateral offset as Z varies. Measurement of Z variations could be accomplished with, for example, a laser or radar.

Note that the interpolation is only approximate at points other than those sampled. However, the error introduced by interpolation or curve fitting (which can be determined) is very small, and negligible compared to other sources of error (e.g. vehicle bounce, sampling away from the magnet, sensor noise, etc.). The greatest source of error in general will be the use of this map, which is valid for one fixed X and Z at values away from these points. One could use a linear approximation in the current case, although it would be a very poor and inaccurate chose. On the other hand, a third order polynomial fit is more appropriate. For example, a linear approximation is given by:

$$Y = \frac{SensorSpacing}{2} * (Y' + 1) \quad (3)$$

whereas a third order (cubic) polynomial approximation is given by:

$$Y = 0.15 + 0.224 * Y' - 0.080 * (Y')^3. \quad (4)$$

Figure 11:
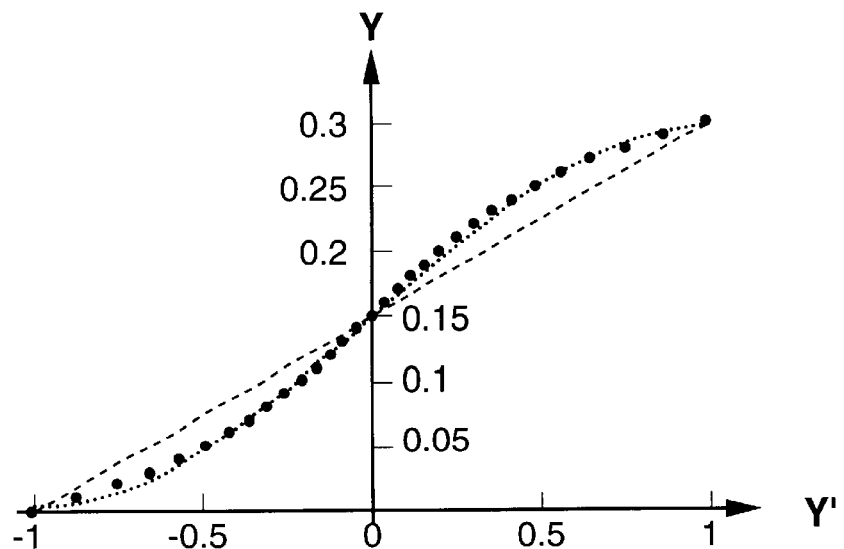
FIG. 11 is a graph showing a linear and polynomial fit of the curve shown in FIG. 10.

Referring to FIG. 11, the large dotted line is the actual mapping from FIG. 10, the small dotted line is the third order polynomial fit, and the dashed line is the linear approximation. As can be seen, the third order polynomial fit is more accurate.

Of course, other sources of error will have an impact, including presence of magnetic or ferrous material in the roadway, etc. The point here is that there is no need for sophisticated interpolation, or very close sampling, as that aspect will introduce only a small portion of the error.

6.2 Single-Axis, Z-Axis Configuration.

Figure 12:
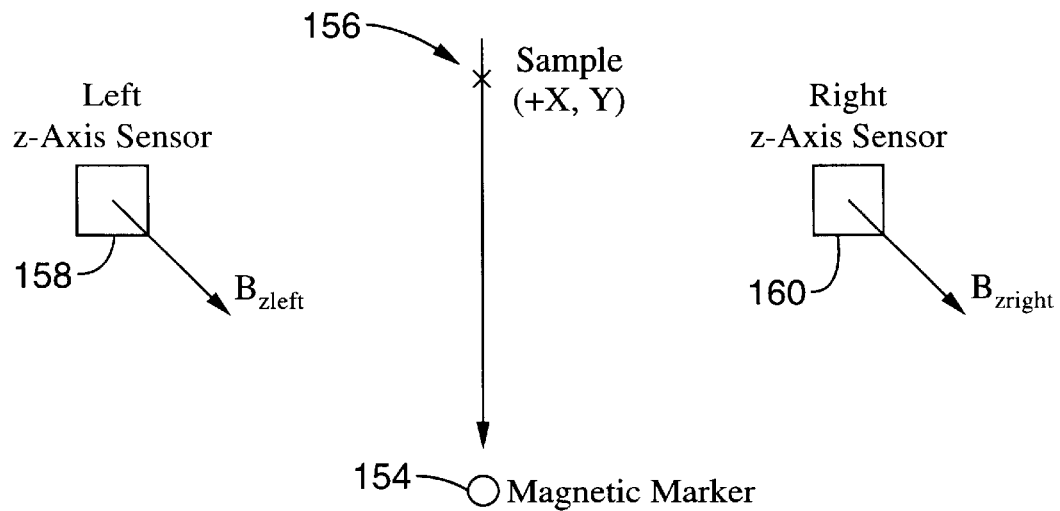
FIG. 12 is a schematic diagram of a top plan view of an embodiment of a single-axis, z-axis sensor configuration according to the present invention.
Figure 13:
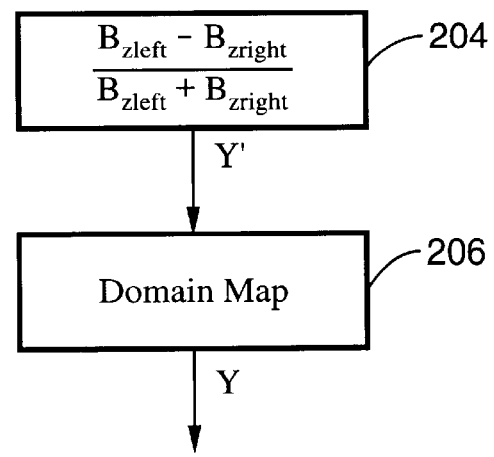
FIG. 13 is a flow diagram of an embodiment of a method for determining lateral offset using the sensor configuration shown in FIG. 12.

FIG. 12 depicts a schematic layout of left 158 and right 160 z-axis sensors in relation to a magnetic marker 154 and a sample location 156. FIG. 13 depicts a corresponding algorithm for determining lateral offset in this single-axis, dual sensor, z-axis configuration. The algorithm shown in FIG. 13 may be used to sample the magnetic marker B-Field at any detectable location. At step 204, the field strength ratio $$F[\vec{B}_{left}, \vec{B}_{right}] = \frac{B_{zleft} - B_{zright}}{B_{zleft} + B_{zright}} \quad (5)$$

is mapped, and at step 206 the Y' map is sliced and a domain map from which the lateral offset Y can be determined is produced as before.

Figure 14:
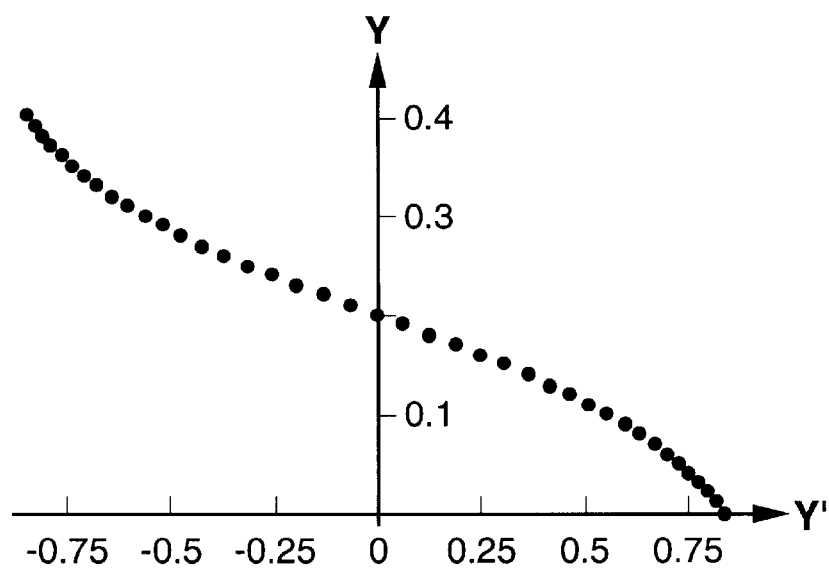
FIG. 14 is an example of a domain map generated according to the method shown in FIG. 13.

Using the parameters described in Section 6.1, a domain map from which the lateral offset Y can be determined is shown in FIG. 14. A linear approximation is given by:

$$Y = \frac{-0.2}{0.84} * Y' + \frac{SensorSpacing}{2} \quad (6)$$

whereas a third order (cubic) polynomial approximation is given by:

$$Y = 0.2 - 0.14 * Y' - 0.131 * (Y')^3. \quad (7)$$

Figure 15:
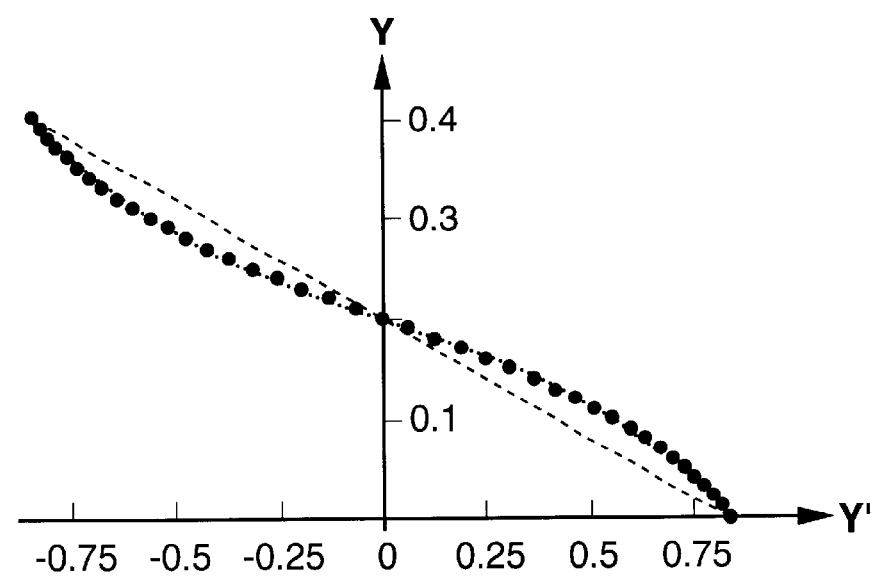
FIG. 15 is a graph showing a linear and polynomial fit of the curve shown in FIG. 14.

Referring to FIG. 15, the large dotted line is the actual mapping from FIG. 14, the small dotted line is the third order polynomial fit, and the dashed line is the linear approximation. As can be seen, the linear approximation is very poor and inaccurate while the third order polynomial fit is more accurate and preferred.

6.3 Dual-Axis, YZ-Axis Configuration.

Figure 16:
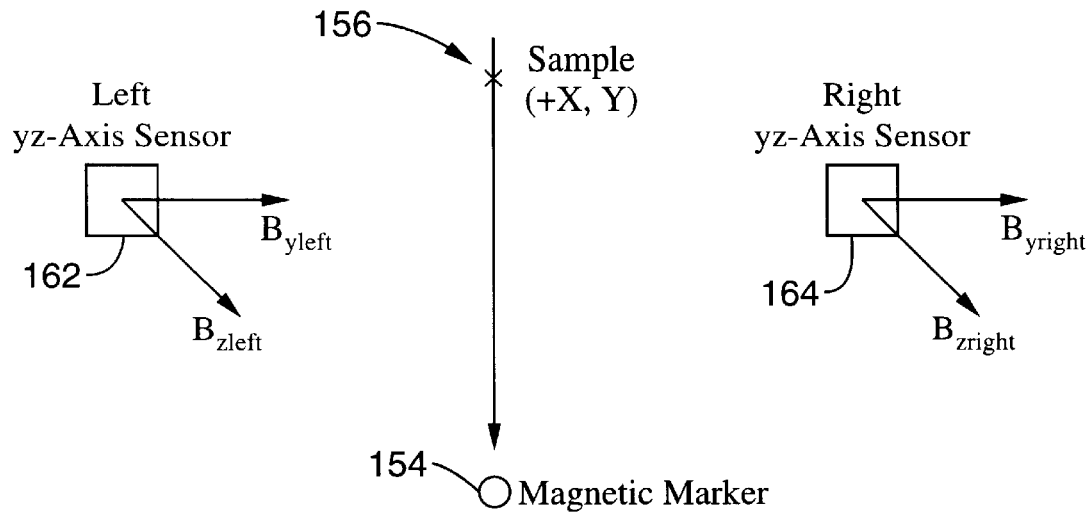
FIG. 16 is a schematic diagram of a top plan view of an embodiment of a dual-axis, yz-axis sensor configuration according to the present invention.
Figure 17:
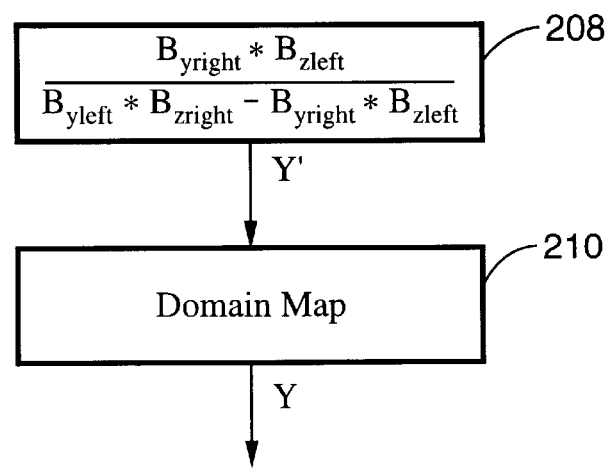
FIG. 17 is a flow diagram of an embodiment of a method for determining lateral offset using the sensor configuration shown in FIG. 16.

The method for determining lateral offset in a dual-axis, yz-axis configuration is essentially an extension of the two single-axis methods described above. FIG. 16 depicts a schematic layout of left 162 and right 164 yz axis sensors in relation to a magnetic marker 154 and a sample location 156. FIG. 17 depicts a corresponding algorithm for determining lateral offset in this configuration. The algorithm shown in FIG. 17 may be used to sample the magnetic marker B-Field at any detectable location. At step 208, the field strength ratio $$F[\vec{B}_{left}, \vec{B}_{right}] = \frac{B_{yright} * B_{zleft}}{B_{yleft} * B_{zright} - B_{yright} * B_{zleft}} \quad (8)$$

is mapped, and at step 210 the Y' map is sliced and a domain map from which the lateral offset Y can be determined is produced as before.

In this example, assume the following:

(a) Sensor Configuration Parameters (based on specific application):

SensorSpacing=0.20 meters; and

RideHeight=0.30 meters.

(b) B-Field equations based on magnetic dipole model:

$$By[x, y, z] = \frac{\mu M}{4\pi(\sqrt{x^2 + y^2 + z^2})^5}(3yz); \quad (9)$$

$$Bz[x, y, z] = \frac{\mu M}{4\pi(\sqrt{x^2 + y^2 + z^2})^5}(2z^2 - x^2 - y^2). \quad (10)$$

Figure 18:
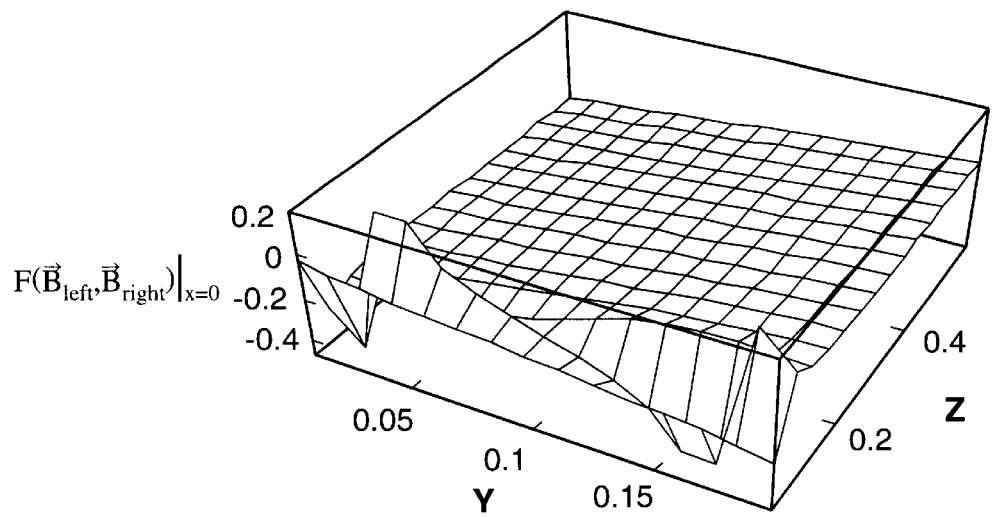
FIG. 18 is an example of a three-dimensional B-field plot corresponding to the sensor configuration shown in FIG. 16 and method for determining lateral offset shown in FIG. 17.
Figure 19:
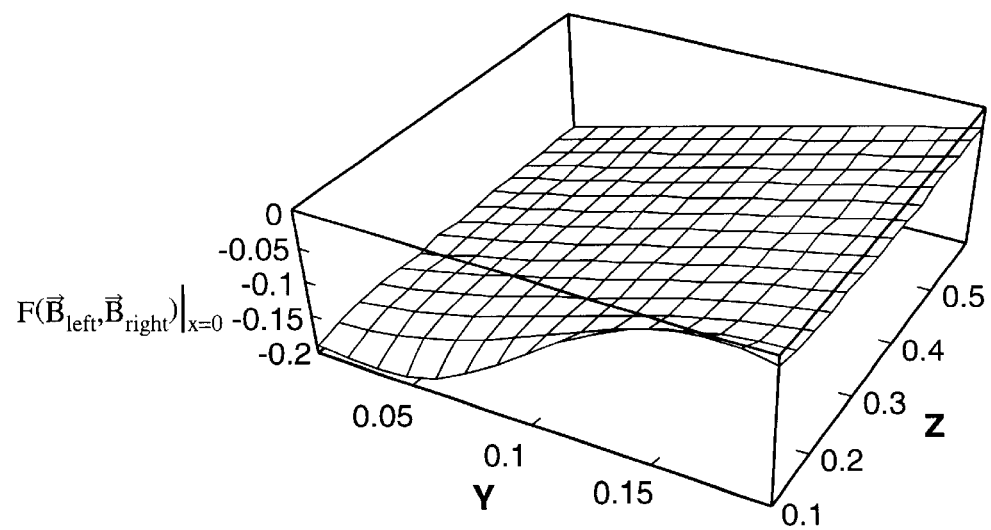
FIG. 19 is an example of the three-dimensional B-field plot shown in FIG. 18 after removing low and ill-behaved values of Z.

FIG. 18 provides a look at this ratio for fixed X=0 (i.e. right over magnet along roadway), as it varies with respect to Y (lateral offset) and Z (ride height of the sensor above the magnet). As can be seen, for the specific ratio selected herein, the ratio is ill-behaved as Z goes to zero; that is, when the sensor essentially sits on top of the magnet. This is fairly typical and is not a problem because we want the sensor above the roadway for clearance in any event. For purposes of clarity, the plot is reproduced in FIG. 19 with the low (and unreasonable in many applications) values of Z removed.

Figure 20:
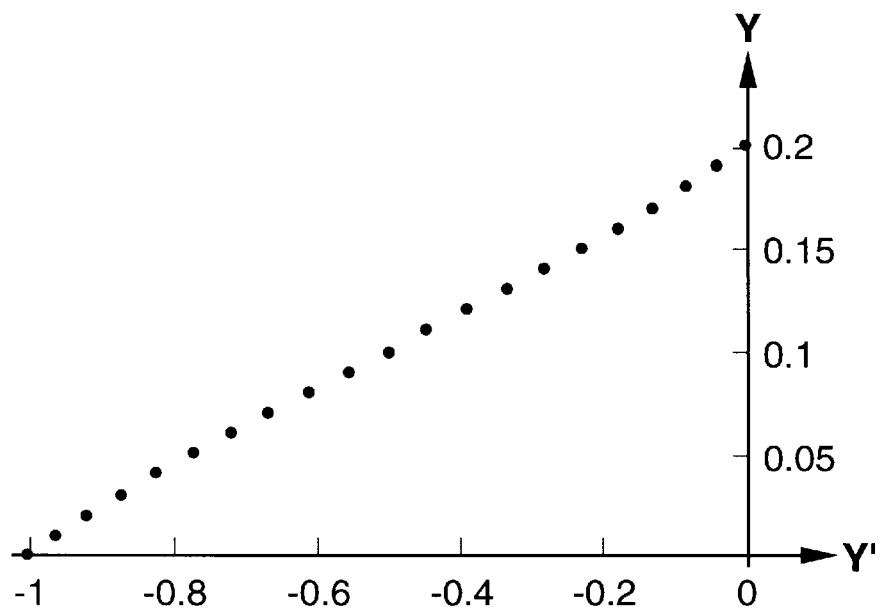
FIG. 20 is an example of a domain map generated according to the method shown in FIG. 17.

Using the parameters described above, a domain map from which the lateral offset Y can be determined is shown in FIG. 20. A linear approximation is given by:

$$Y=\text{SensorSpacing}*(Y'+1) \quad (11)$$

whereas a third order (cubic) polynomial approximation is given by:

$$Y=0.2+0.244*Y'+0.133(Y')^2+0.089*(Y')^3. \quad (12)$$

Figure 21:
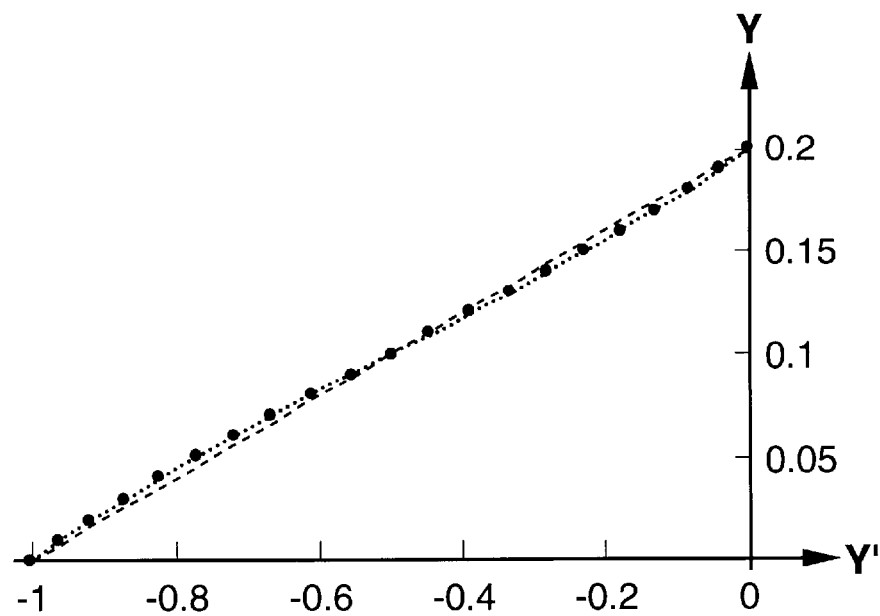
FIG. 21 is a graph showing a linear and polynomial fit of the curve shown in FIG. 20.

Referring to FIG. 21, the large dotted line is the actual mapping from FIG. 20, the small dotted line is the third order polynomial fit, and the dashed line is the linear approximation. As can be seen, the linear approximation provides very good results although the third order polynomial fit is slightly more accurate.

6.4 Dual-Axis, XY-Axis Configuration.

Figure 22:
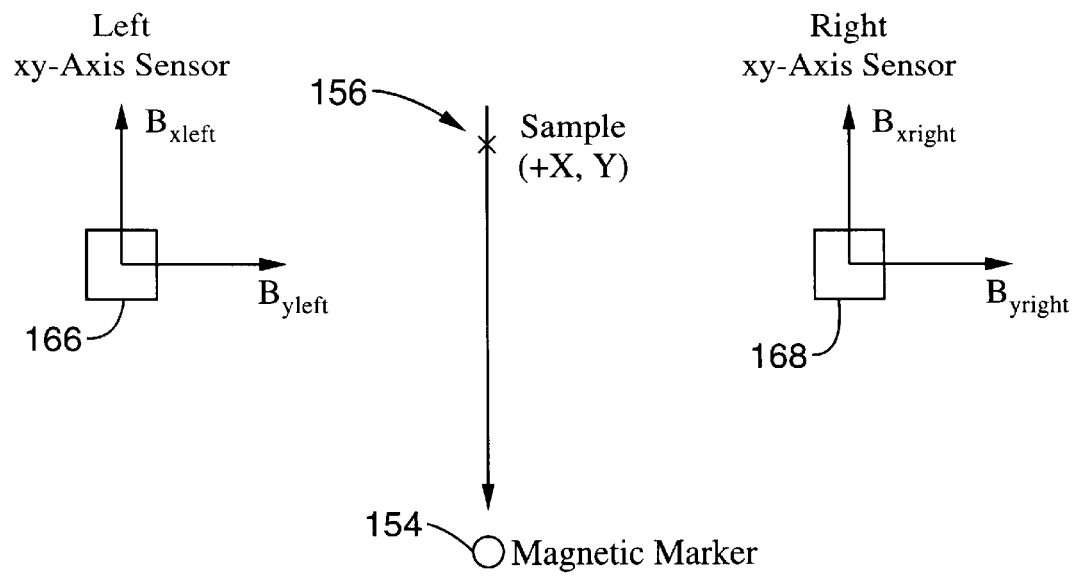
FIG. 22 is a schematic diagram of a top plan view of an embodiment of a dual-axis, xy-axis sensor configuration according to the present invention.
Figure 23:
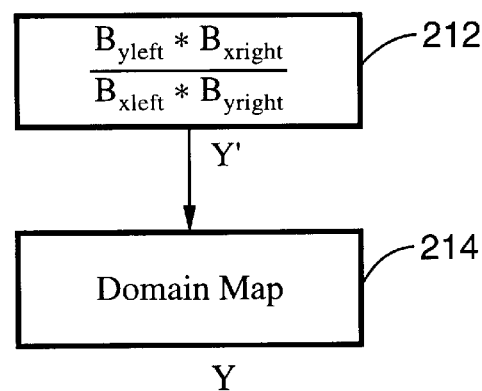
FIG. 23 is a flow diagram of an embodiment of a method for determining lateral offset using the sensor configuration shown in FIG. 22.

FIG. 22 depicts a schematic layout of left 166 and right 168 xy-axis sensors in relation to a magnetic marker 154 and a sample location 156. FIG. 23 depicts a corresponding algorithm for determining lateral offset in this dual-axis, xy-axis configuration. At step 212, the field strength ratio $$F[\vec{B}_{left}, \vec{B}_{right}] = \frac{B_{yleft} * B_{xright}}{B_{xleft} * B_{yright}} \quad (13)$$

is mapped, and at step 214 the Y' map is sliced and a domain map from which the lateral offset Y can be determined is produced as before. This algorithm may sample the magnetic marker field at any detectable location in the +x or −x direction. However, the algorithm is not valid when X=0 (i.e., right over the magnet along the roadway) or for a lateral offset approaching Y=SensorSpacing.

In this example, we limit the algorithm to apply to X≠0, and for Y between 0 and 0.75 * SensorSpacing. Also, assume the following:

SensorSpacing=0.30 meters; and

RideHeight=0.30 meters.

Figure 24:
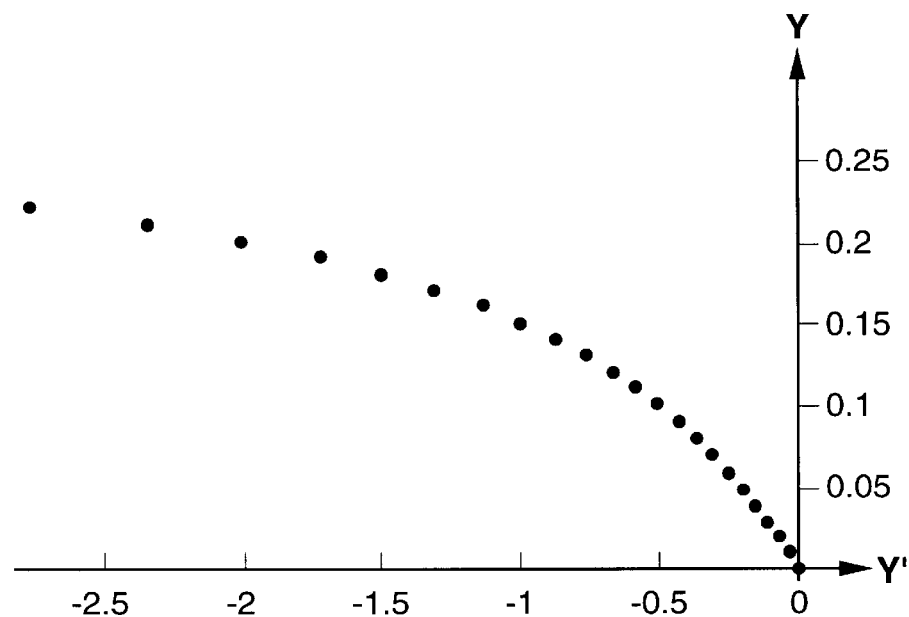
FIG. 24 is an example of a domain map generated according to the method shown in FIG. 23.

Using these parameters, a domain map from which the lateral offset Y can be determined is shown in FIG. 24. A linear approximation is given by:

$$Y=-0.082*Y'+0.042 \quad (14)$$

whereas a third order (cubic) polynomial approximation is given by:

$$Y=0.005-0.233*Y'-0.103(Y')^2-0.017*(Y')^3. \quad (15)$$

Figure 25:
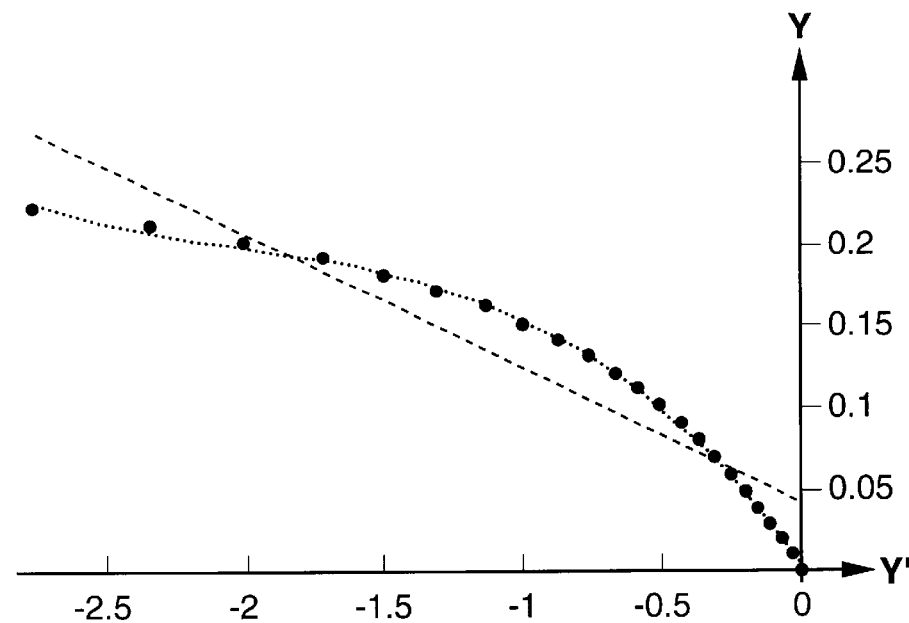
FIG. 25 is a graph showing a linear and polynomial fit of the curve shown in FIG. 24.

Referring to FIG. 25, the large dotted line is the actual mapping from FIG. 24, the small dotted line is the third order polynomial fit, and the dashed line is the linear approximation. As can be seen, the linear approximation is a very poor and inaccurate choice, and is strongly discouraged as a fit. On the other hand, the third order polynomial fit is much more accurate and definitely preferred.

6.5 Triple-Axis. XYZ-Axis Configuration.

Figure 26:
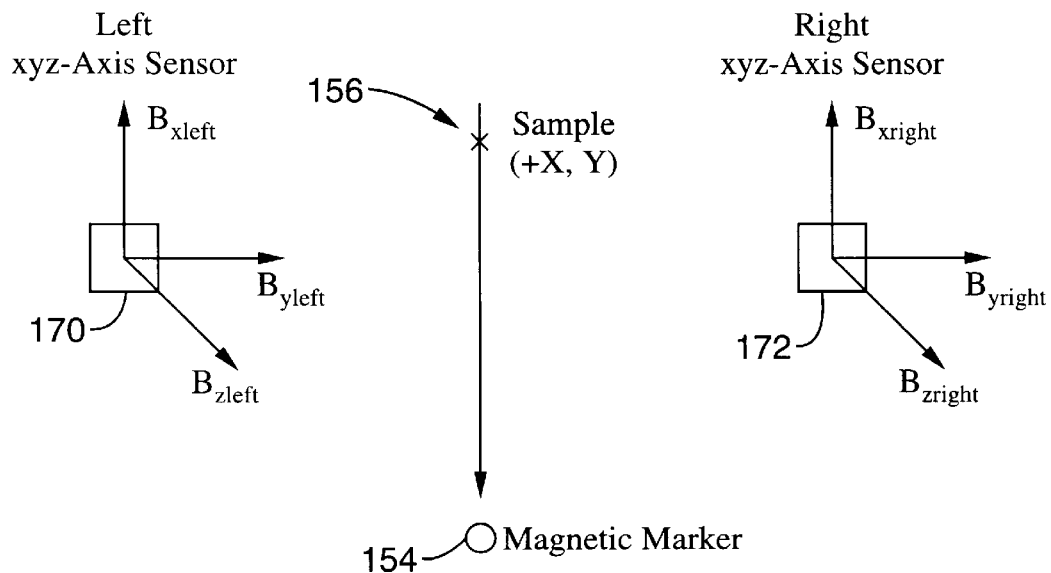
FIG. 26 is a schematic diagram of a top plan view of an embodiment of a triple-axis, x-y-z axis sensor configuration according to the present invention.
Figure 27:
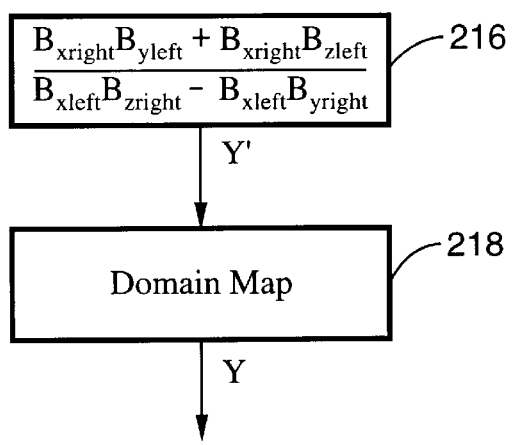
FIG. 27 is a flow diagram of an embodiment of a method for determining lateral offset using the sensor configuration shown in FIG. 26.

FIG. 26 depicts a schematic layout of left 170 and right 172 xyz-axis sensors in relation to a magnetic marker 154 and a sample location 156. FIG. 27 depicts a corresponding algorithm for determining lateral offset in this triple-axis, xyz-axis configuration. At step 216, the field strength ratio $$F[\vec{B}_{left}, \vec{B}_{right}] = \frac{B_{xright}B_{yleft} + B_{xright}B_{zleft}}{B_{xleft}B_{zright} - B_{xleft} * B_{yright}} \quad (16)$$

is mapped, and at step 218 the Y' map is sliced and a domain map from which the lateral offset Y can be determined is produced as before. Using the parameters In this example, assume the following:

SensorSpacing=0.40 meters; and

RideHeight=0.40 meters.

Figure 28:
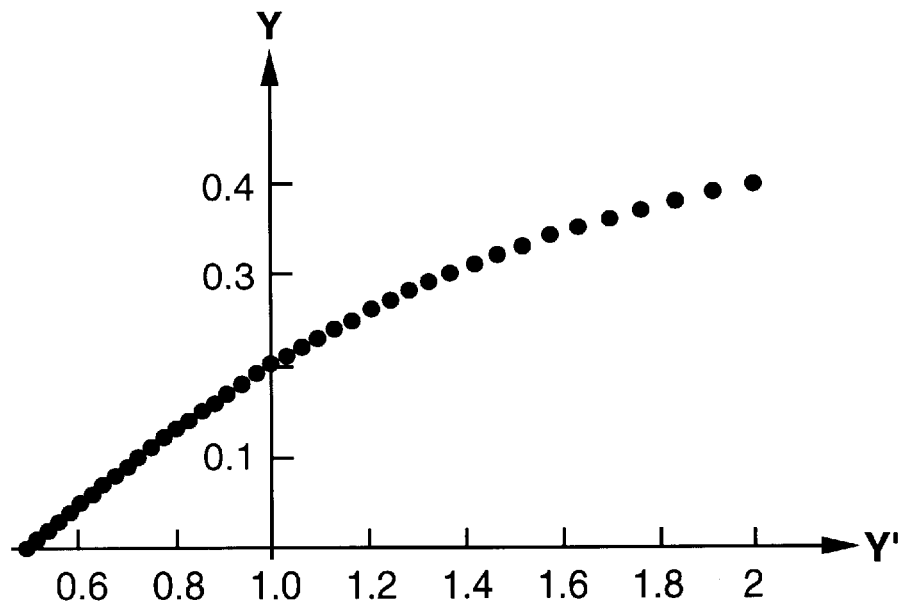
FIG. 28 is an example of a domain map generated according to the method shown in FIG. 27.

Using these parameters, a domain map from which the lateral offset Y can be determined is shown in FIG. 28. A linear approximation is given by:

$$Y=0.278*Y'-0.1 \quad (17)$$

whereas a second order (quadratic) polynomial approximation is given by:

$$Y = -0.26 + 0.59 * Y' - 0.131 * (Y')^2. \quad (18)$$

Figure 29:
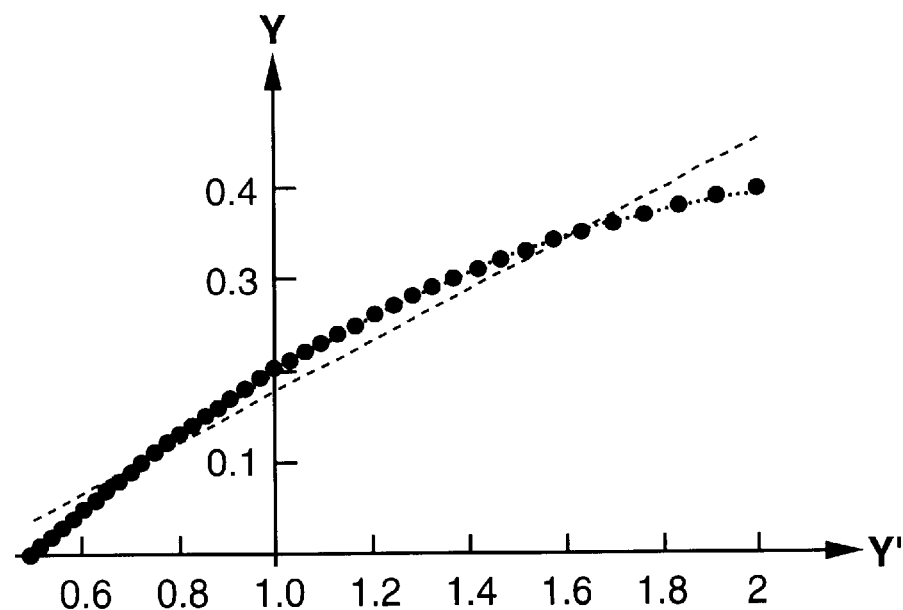
FIG. 29 is a graph showing a linear and polynomial fit of the curve shown in FIG. 28.

Referring to FIG. 29, the large dotted line is the actual mapping from FIG. 28, the small dotted line is the second order polynomial fit, and the dashed line is the linear approximation. As can be seen, the linear approximation provides very poor and inaccurate results and should not be used. On the other hand, the second order polynomial fit is much more accurate and preferred.

7. Discrete Magnetic Marker X-Measure (Longitudinal) Algorithm.

Figure 30:
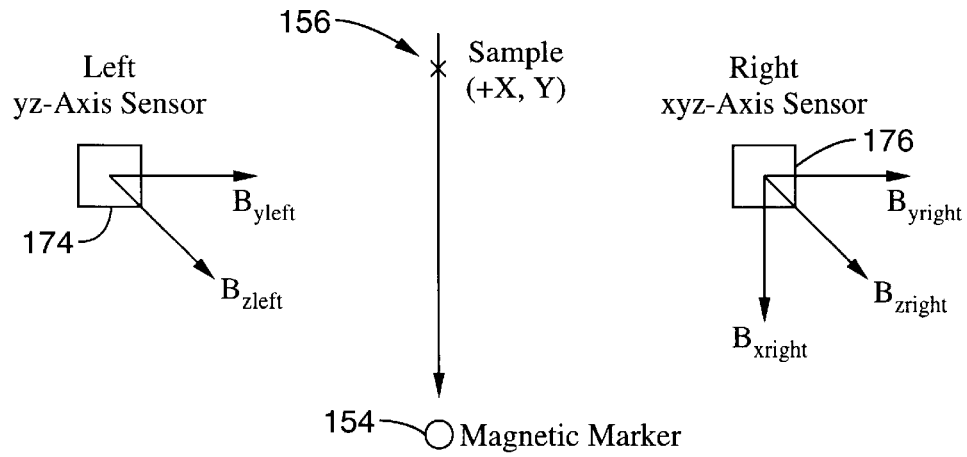
FIG. 30 is a schematic diagram of a top plan view of an embodiment of a single-axis, x-axis sensor configuration according to the present invention.
Figure 31:
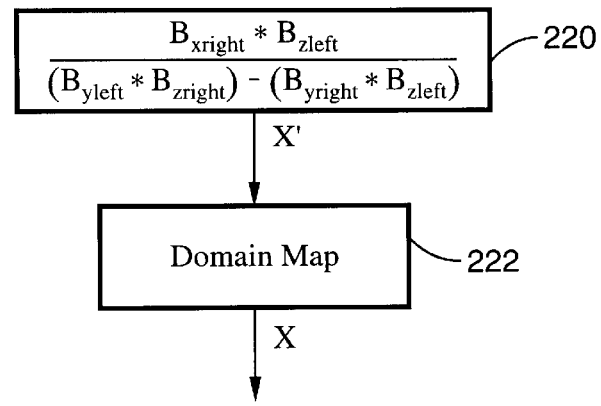
FIG. 31 is a flow diagram of an embodiment of a method for determining longitudinal offset using the sensor configuration shown in FIG. 30.

It is also possible to measure longitudinal position (along the road) using the techniques described above in connection with yz-axis measurement of lateral distance. However, in addition to using the left and right sensor fields By and Bz, the right sensor's Bx field is used. FIG. 30 depicts a schematic layout of a left yz-axis sensor 174 and a right xyz-axis sensor 176 sensor in relation to a magnetic marker 154 and a sample location 156. FIG. 31 depicts a corresponding algorithm for determining lateral offset in this configuration. At step 220, the field strength ratio $$F[\vec{B}_{left}, \vec{B}_{right}] = \frac{B_{xright} * B_{zleft}}{B_{yleft} * B_{zright} - B_{yright} * B_{zleft}} \quad (19)$$

is determined. This ratio will provide a one-to-one mapping of the sensor outputs to longitudinal offset. The output of this mapping for specified values of Y and Z (lateral and vertical offsets, respectively) is denoted by X'.

For example, assume the following:

(a) Sensor Configuration Parameters (based on specific application):

SensorSpacing=0.20 meters; and

RideHeight=0.50 meters.

(b) B-Field equations based on magnetic dipole model:

$$Bx[x, y, z] = \frac{\mu M}{4\pi(\sqrt{x^2 + y^2 + z^2})^5}(3xz); \quad (20)$$

$$By[x, y, z] = \frac{\mu M}{4\pi(\sqrt{x^2 + y^2 + z^2})^5}(3yz); \quad (21)$$

$$Bz[x, y, z] = \frac{\mu M}{4\pi(\sqrt{x^2 + y^2 + z^2})^5}(2z^2 - x^2 - y^2). \quad (22)$$

Figure 32:
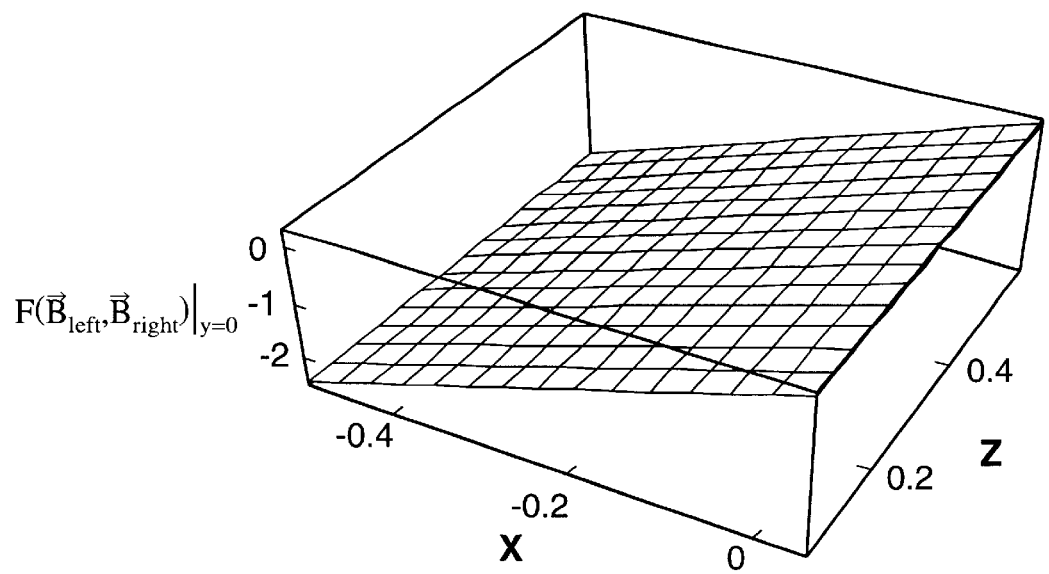
FIG. 32 is an example of a three-dimensional B-field plot corresponding to a the method for determining longitudinal offset shown in FIG. 31.

For the given sensor spacing, FIG. 32 depicts the ratio $F(\vec{B}_{left}, \vec{B}_{right})|_{y=0}$ of the B-Field function. Note that we selected one of the coordinates as fixed in order to visualize the resulting surface; namely, for a fixed value of Y=0 (i.e. right over magnet across roadway) as it varies with respect to X and Z. As can be seen, the surface is very well-behaved.

Figure 33:
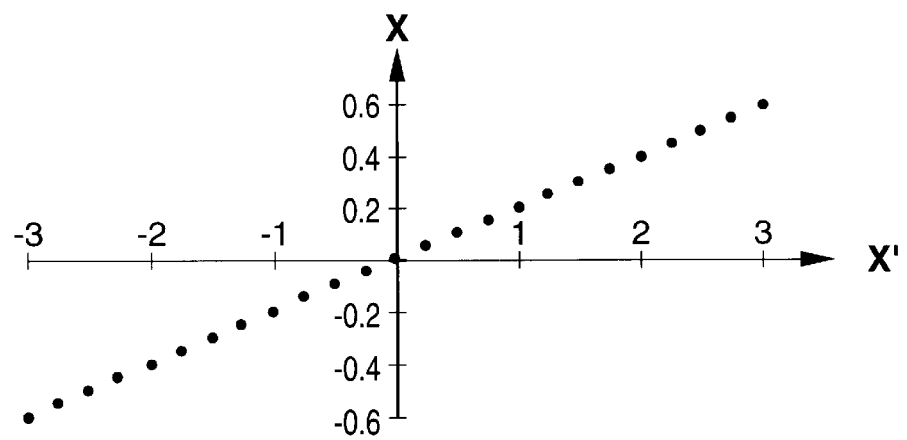
FIG. 33 is an example of a domain map generated according to the method shown in FIG. 31.

At step 222, the surface is sliced through a given Z value as described above to produce a domain map from which the longitudinal offset X can be determined as shown in FIG. 33. Here, a linear approximation can be used with good results and appears to be an exact fit as follows:

$$X = \text{SensorSpacing} * X' \quad (23)$$

which is $$X = \frac{0.6}{3} X' = 0.2 X' \quad (24)$$

for this example.

8. Discrete Magnetic Marker Z-Measure (Vertical) Algorithm.

Vertical offset measurement (above the road) requires a different algorithm than those used for X (longitudinal) and Y (lateral) offset measurements in that lateral position must be known. This is because of the manner in which the Z measure enters the field equations.

Figure 34:
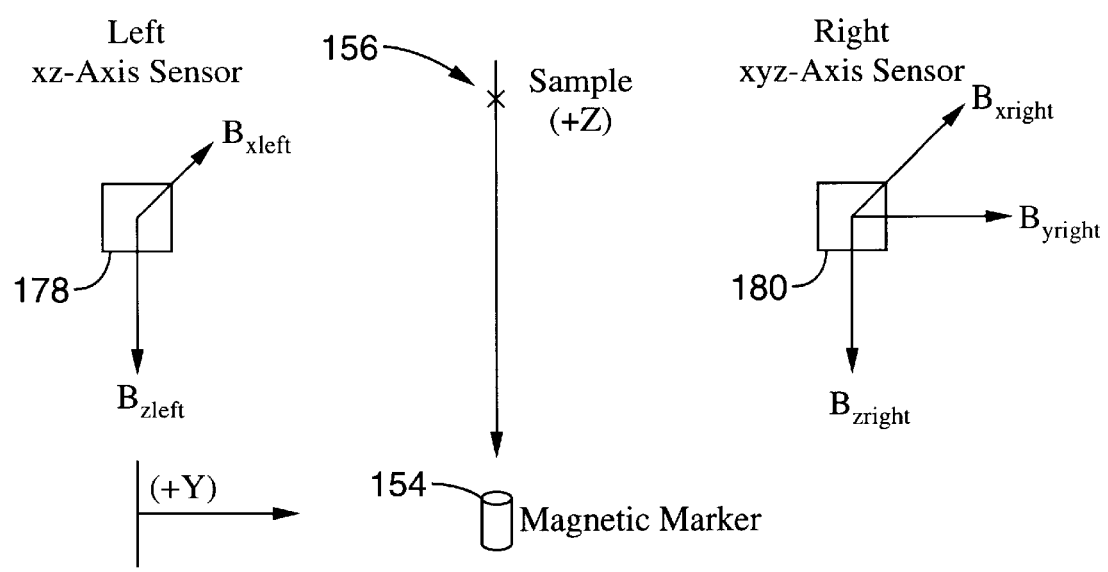
FIG. 34 is a schematic diagram of a side view of an embodiment of a single-axis, z-axis sensor configuration according to the present invention.
Figure 35:
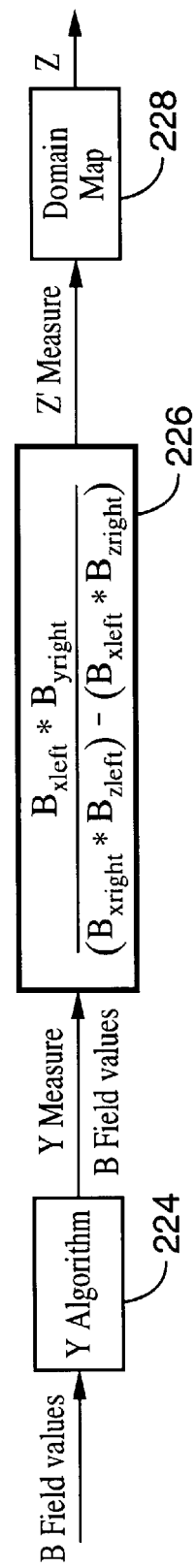
FIG. 35 is a flow diagram of an embodiment of a method for determining vertical offset using the sensor configuration shown in FIG. 34.

Given that the primary goal of the invention is to solve for Y, the preferred Z measure algorithm uses the output of a Y measure algorithm as its input. FIG. 34 depicts a schematic layout of a left xz-axis sensor 178 and a right xyz-axis sensor 180 in relation to a magnetic marker 154 and a sample location 156. FIG. 35 illustrates the general method for obtaining the Z measure. At block 224, any of the Y measure methods previously described are used to obtain a Y measure. This then becomes the input for determining the Z measure at block 226. The field strength ratio $$F[\vec{B}_{left}, \vec{B}_{right}] = \frac{B_{xleft} * B_{yright}}{B_{xright} * B_{zleft} - B_{xleft} * B_{zright}} \quad (25)$$

is insensitive to variation in X, but is equally sensitive in Y and Z. At step 228 the Z' map is sliced and a domain map from which the vertical offset Z can be determined is produced as before. Assuming that Y is known, it is trivial to solve for Z due to the simple resultant linear mapping that is achieved. The ratio used here is based on use of two sensors as before, a single sample, left and right sensor fields for Bx and Bz, and the right sensor's By field. Note also that the measure provided here is valid for Y<SensorSpacing/2, which is a singularity of the resulting ratio. It is preferable to stay somewhat below this hard singularity.

For example, assume the following:

(a) Sensor Configuration Parameters (based on specific application):

SensorSpacing=0.40 meters; and

RideHeight=0.30 meters.

(b) B-Field equations based on magnetic dipole model:

$$Bx[x, y, z] = \frac{\mu M}{4\pi(\sqrt{x^2 + y^2 + z^2})^5}(3xz); \quad (26)$$

$$By[x, y, z] = \frac{\mu M}{4\pi(\sqrt{x^2 + y^2 + z^2})^5}(3yz); \quad (27)$$

$$Bz[x, y, z] = \frac{\mu M}{4\pi(\sqrt{x^2 + y^2 + z^2})^5}(2z^2 - x^2 - y^2). \quad (28)$$

Figure 36:
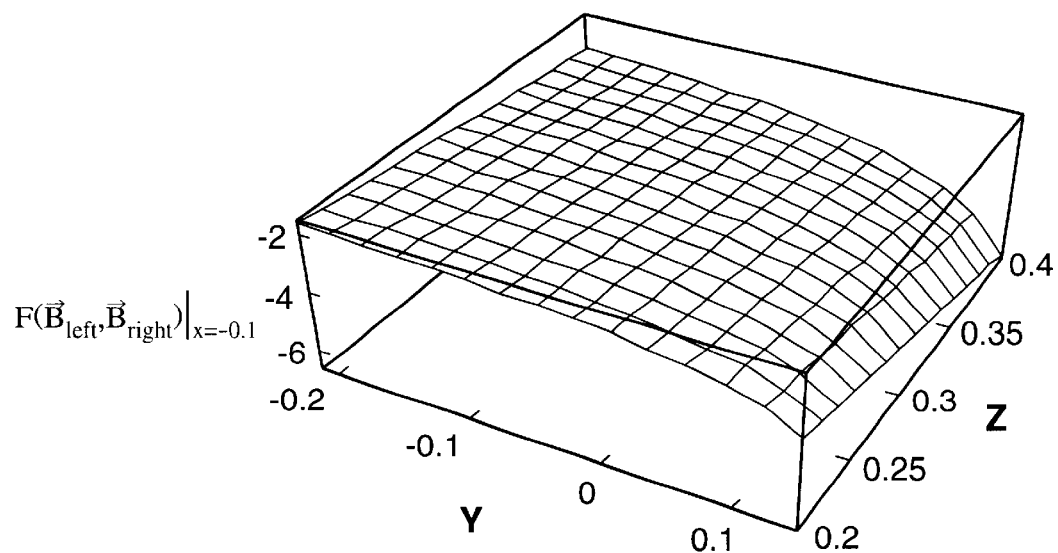
FIG. 36 is an example of a three-dimensional B-field plot corresponding to a the method for determining vertical offset shown in FIG. 35.

FIG. 36 provides a look at the ratio for fixed X=−0.1 (i.e. 10 cm before crossing the magnet along the roadway), as it varies with respect to Y and Z. Note that the surface of FIG. 36 is at least as dependent upon the lateral location (Y value) as it is upon height (Z value, the term which is being solved). This motivates the use of the Y value to determine the specific mapping. The approximate value of Y is obtained from any of the Y measure algorithms previously described, and used as an input to the Z measure algorithm.

Note also that we select one of the coordinates as fixed in order to visualize the resulting surface. For example, select the ratio function at some fixed Y and X (here, we choose $x_0=0.1$. The choice of $x_0$ is not at all critical, since this ratio turns out to be completely independent of X. Note also that until we select a Y from the lateral sensing algorithm, this mapping corresponds to the entire surface of FIG. 36. Once we select a given Y, however, the mapping is a function of Z on the surface for that fixed value of Y (i.e., a slice of the surface along Z through a fixed Y value).

Figure 37:
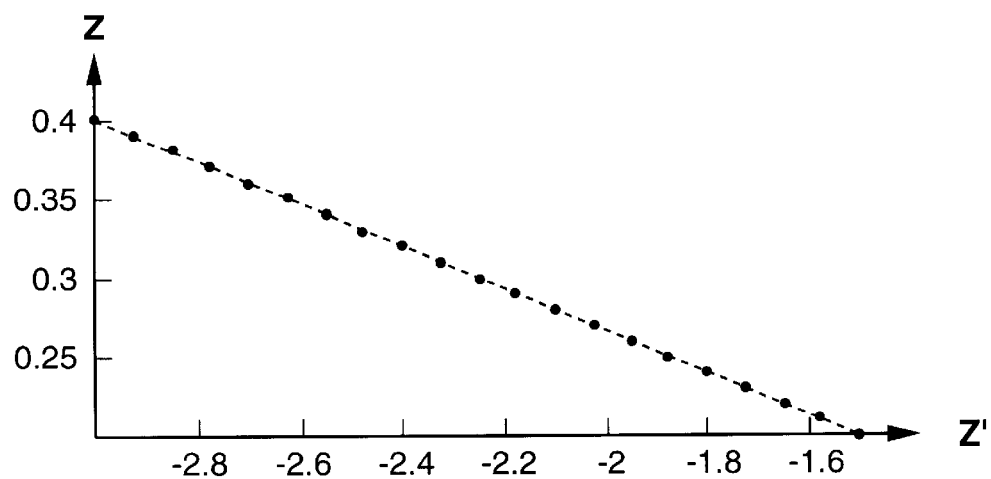
FIG. 37 is an example of a domain map generated according to the method shown in FIG. 35.

FIG. 37 shows the corresponding domain map (dotted line) from which the vertical offset Z can be determined. As can be seen, a linear approximation (dashed line) can be used with good results and appears to be an exact fit as follows:

$$Z = \frac{SensorSpacing*(SensorSpacing - 2*Y)}{3*(Y - SensorSpacing)} *Z \quad (29)$$

9. Continuous Magnetic Marker Lateral Offset Algorithms.
9.1 Single-Axis, Y-Axis Configuration.

Referring again to FIG. 7, a single-axis, dual-sensor, y-axis configuration is shown. However, assume that a continuous magnetic tape is employed instead of using discrete magnetic markers 154. Such a tape is available from 3M® company and is used in snowplow and other vehicle guidance applications. The magnetic tape is usually magnetized with a square wave pattern and can be modeled as a series of magnetic dipoles of alternating polarity arranged in sections of the tape. In the example described herein, we are using a finite number of sections and, at a certain point, the influence of further sections on the computation is negligible. By "section", we mean a single portion of the tape with a given polarity. Thus, by definition, a single period comprises two alternating sections. The exact number of sections required in the field of view for a given accuracy is uncertain, but thirteen sections were found to be sufficient to minimize end effects. The number of dipoles per section in our simulation was also truncated at twenty-five. In this case, the ratio of FIG. 8, namely Eq. (1), would apply as well.

For example, assume the following:
(a) Sensor Configuration Parameters (based on specific application):

SensorSpacing=0.20 meters; and

RideHeight=0.40 meters.

(b) Magnetic Field Parameters:

$\mu=4\pi 10^{-7}$(Wb m)/A; and $M=1.5\times10^3$(A m²);

where $\mu$ is for free space. Air is very close to this value (up to about 7 significant figures). The value for M is per dipole of the model, with the value selected to closely match the field values in the literature for magnetic pavement marking tape. Note that these magnetic field parameters apply to all instances of the determination of offsets using discrete continuous tape described herein. Also assume:

(c) Tape configuration parameters:

SectionLength=1.83 meters;

NumberDipoles (per section)=25;

NumberSections=13.

Note that these tape configuration parameters apply to all instances of the determination of offsets using discrete continuous tape described herein.

(d) B-Field equations based on magnetic dipole model:

$$dipolex[i, j] \triangleq SectionLength\left(i + \frac{j}{NumberDipoles}\right); \quad (30)$$

$$Bx[x, y, z] = \frac{3\mu Mz}{4\pi} \sum_{i=-\frac{NumberSections-1}{2}}^{\frac{NumberSections-1}{2}} \left( (-1)^i \sum_{j=-\frac{NumberDipoles-1}{2}}^{\frac{NumberDipoles-1}{2}} \frac{(x - dipolex[i, j])}{\left(\sqrt{(x - dipolex[i, j])^2 + y^2 + z^2}\right)^5} \right) \quad (31)$$

$$By[x, y, z] = \frac{3\mu Myz}{4\pi} \sum_{i=-\frac{NumberSections-1}{2}}^{\frac{NumberSections-1}{2}} \left( (-1)^i \sum_{j=-\frac{NumberDipoles-1}{2}}^{\frac{NumberDipoles-1}{2}} \frac{1}{\left(\sqrt{(x - dipolex[i, j])^2 + y^2 + z^2}\right)^5} \right) \quad (32)$$

$$Bz[x, y, z] = \frac{3\mu M}{4\pi} \sum_{i=-\frac{NumberSections-1}{2}}^{\frac{NumberSections-1}{2}} \left( (-1)^i \sum_{j=-\frac{NumberDipoles-1}{2}}^{\frac{NumberDipoles-1}{2}} \frac{2z^2 - (x - dipolex[i, j])^2 - y^2}{\left(\sqrt{(x - dipolex[i, j])^2 + y^2 + z^2}\right)^5} \right) \quad (33)$$

Figure 38:
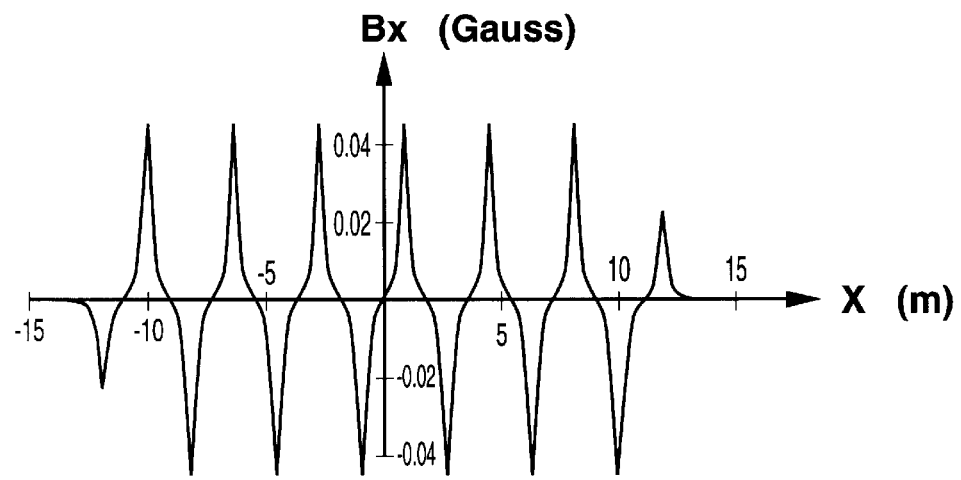
FIG. 38 is a graph showing an example of the value and polarity of the x-axis component, Bx, of the magnetic field of a continuous magnetic tape reference marker as a function of x (along tape).
Figure 39:
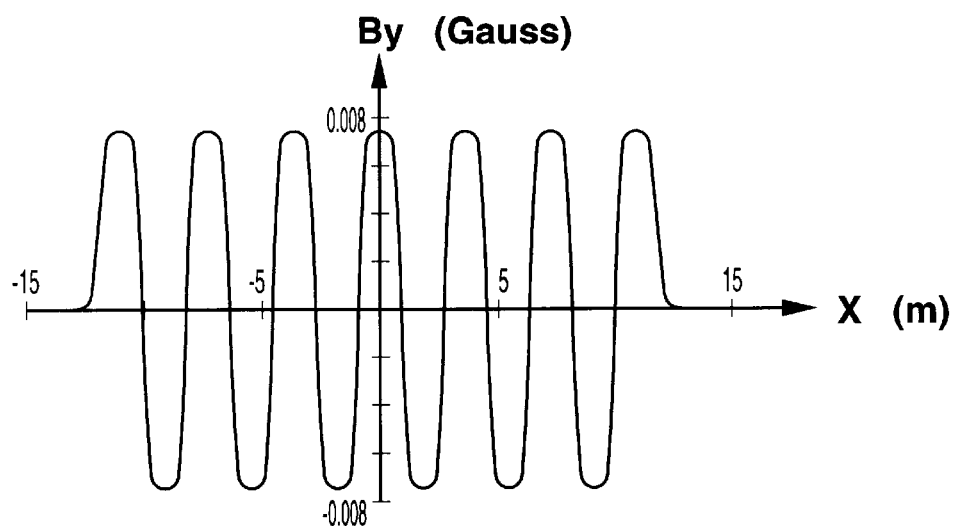
FIG. 39 is a graph showing an example of the value and polarity of the y-axis component, By, of the magnetic field of a continuous magnetic tape reference marker as a function of x (along tape).
Figure 40:
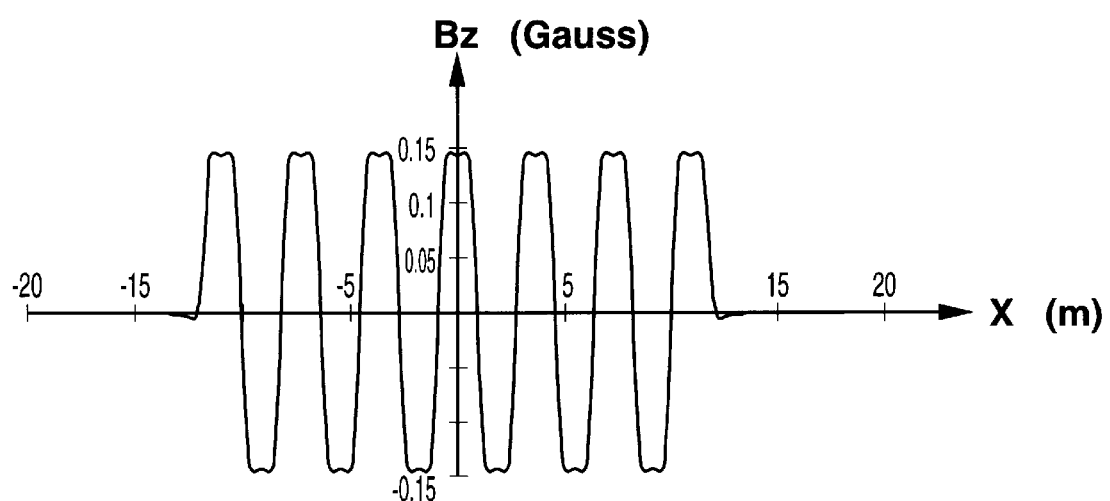
FIG. 40 is a graph showing an example of the value and polarity of the z-axis component, Bz, of the magnetic field of a continuous magnetic tape reference marker as a function of x (along tape).

Note that these field equations apply to all instances of the determination of offsets using discrete continuous tape described herein. Note also that these field equations are actually less complicated than they may appear. Here, the model for a given section of tape is a number of small discrete dipoles spaced evenly through the section. Therefore, what is seen in each equation is the inner term being the effect of a single dipole of a give polarity (see the $(-1)^i$ term for polarity). The inner summation adds the effects of each dipole in a given section, while the outer summation adds the effects of each section. Note that terms constant with respect to a given summation have been pulled out to expedite the computation. FIG. 38, FIG. 39, and FIG. 40 are examples of field plots for Bx, By and Bz, respectively, at y=2.5 cm and z=30 cm. Note the changes in polarity.

Figure 41:
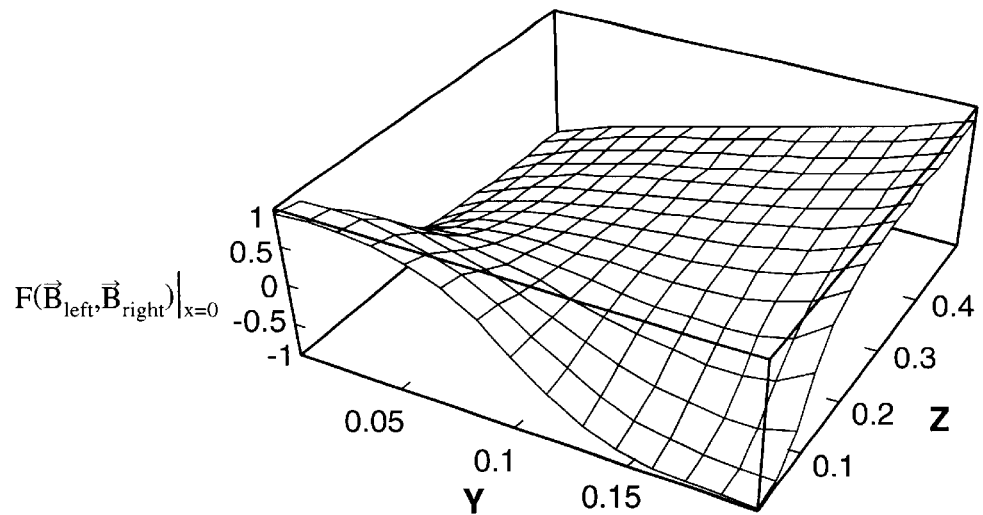
FIG. 41 is an example of a three-dimensional B-field plot corresponding to the sensor configuration of FIG. 7 and method for determining lateral offset in relation to continuous magnetic tape according to the present invention.
Figure 42:
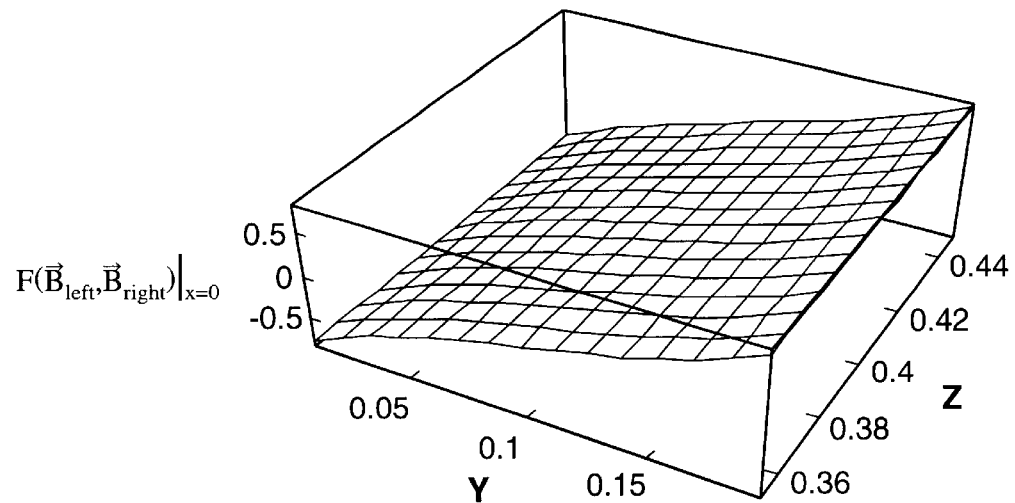
FIG. 42 is an example of a portion of the three-dimensional B-field plot shown in FIG. 41 after removing low height values of Z.

FIG. 41 provides a look at the B-Field ratio for fixed X=0 (i.e. right over center-most section of tape along roadway), as it varies with respect to Y (lateral offset) and Z (ride height of the sensor above the tape). As can be seen, at low heights the ratio is not acceptable because it is highly non-linear, not one-to-one, and has a high variation for vehicle bounce. However, it is very attractive for larger mounting heights as shown in FIG. 42 which is a subset of FIG. 41. Since we want clearance for the sensor anyway, the response at low heights is not a concern.

Figure 43:
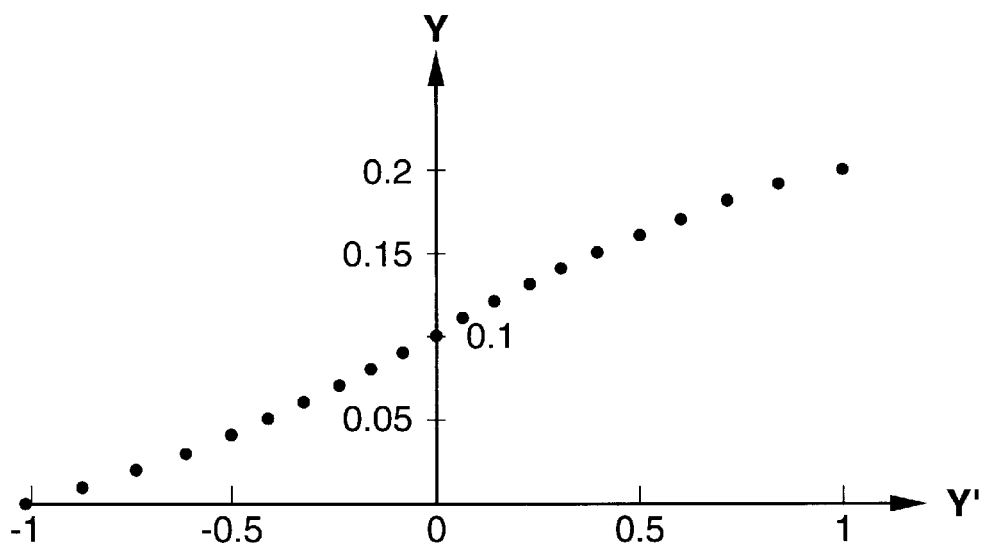
FIG. 43 is an example of a domain map generated according to the method shown in FIG. 8 applied to a continuous magnetic tape reference marker using a single-axis, y-axis sensor configuration as shown in FIG. 7.

FIG. 43 shows the corresponding domain map from which Y can be determined. A linear approximation is given by:

$$Y = \frac{SensorSpacing}{2} * (Y' + 1) \tag{34}$$

whereas a third order (cubic) polynomial approximation is given by:

$$Y=0.1+0.126*Y'-0.027*(Y')^3. \tag{35}$$

Figure 44:
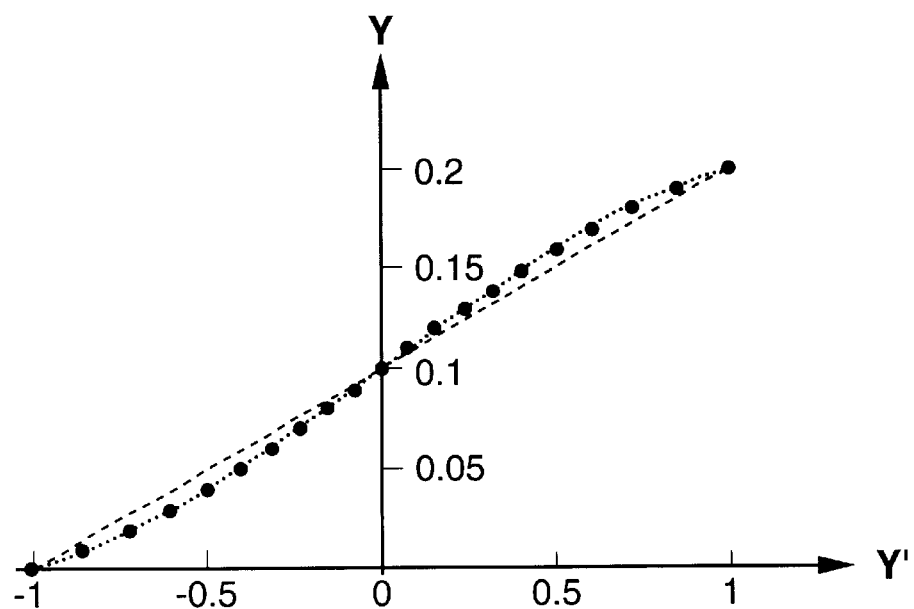
FIG. 44 is a graph showing a linear and polynomial fit of the curve shown in FIG. 43.

Referring to FIG. 44, the large dotted line is the actual mapping from FIG. 43, the small dotted line is the third order polynomial fit, and the dashed line is the linear approximation. As can be seen, the third order polynomial fit is more accurate.

9.2 Single-Axis, Z-Axis Configuration.

Referring again to FIG. 12, a single-axis, z-axis configuration is shown that applies to use of a continuous magnetic tape as well. In this case, the ratio of FIG. 13 and Eq. (5) would apply as well. The method for determining lateral offset in a continuous tape configuration described above in relation to the y-axis configuration simply would be extended to this z-axis configuration.

In this example, assume the following:

SensorSpacing=0.40 meters; and

RideHeight=0.40 meters.

Figure 45:
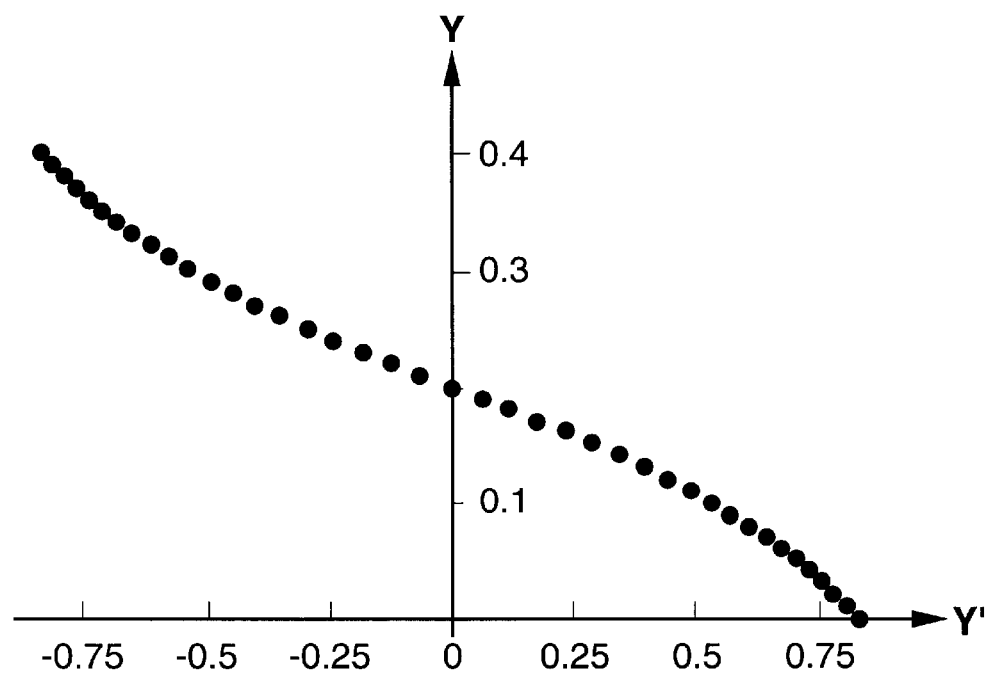
FIG. 45 is an example of a domain map generated according to the method shown in FIG. 13 applied to a continuous magnetic tape reference marker using a single-axis, z-axis sensor configuration as shown in FIG. 12.

Using these parameters, a domain map from which the lateral offset Y can be determined is shown in FIG. 45. A linear approximation is given by:

$$Y = -0.211 * Y' + \frac{SensorSpacing}{2} \tag{36}$$

whereas a third order (cubic) polynomial approximation is given by:

$$Y=0.2-0.154*Y'-0.118*(Y')^3. \tag{37}$$

Figure 46:
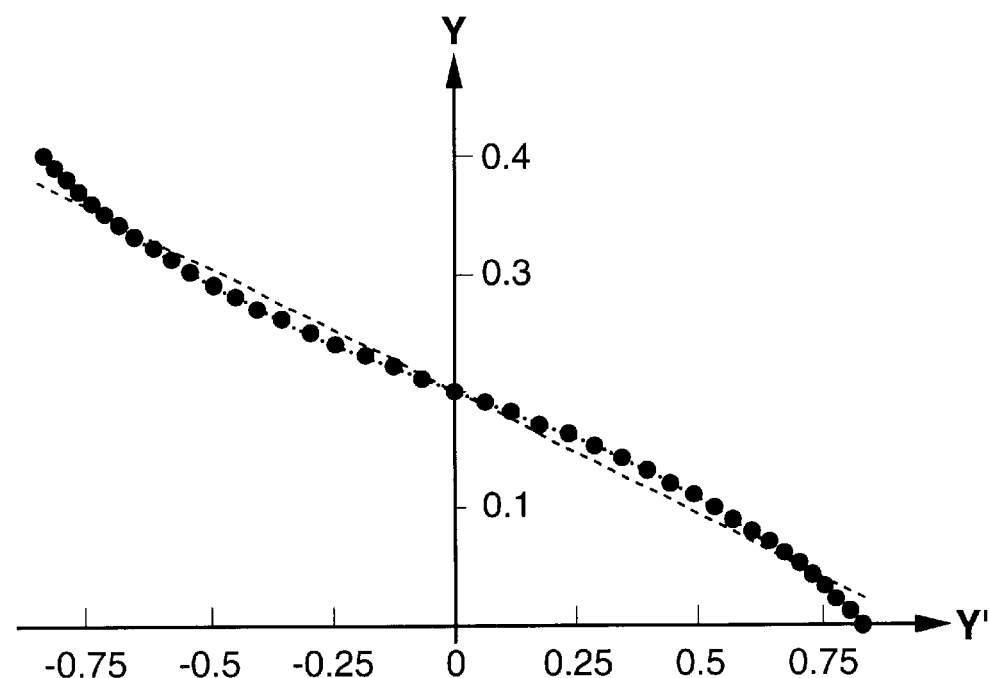
FIG. 46 is a graph showing a linear and polynomial fit of the curve shown in FIG. 45.

Referring to FIG. 46, the large dotted line is the actual mapping from FIG. 45, the small dotted line is the third order polynomial fit, and the dashed line is the linear approximation. As can be seen, the linear approximation provides very good results although the third order polynomial fit is more accurate and preferred.

9.3 Dual-Axis, YZ-Axis Configuration.

Referring again to FIG. 16, a dual-axis, yz-axis configuration is shown that applies to use of a continuous magnetic tape as well. In this case, the ratio of FIG. 17 and Eq. (8) would apply as well. The method for determining lateral offset in a continuous tape configuration described above in relation to the z-axis configuration simply would be extended to this yz-axis configuration.

In this example, assume the following:

SensorSpacing=0.20 meters; and

RideHeight=0.30 meters.

Figure 47:
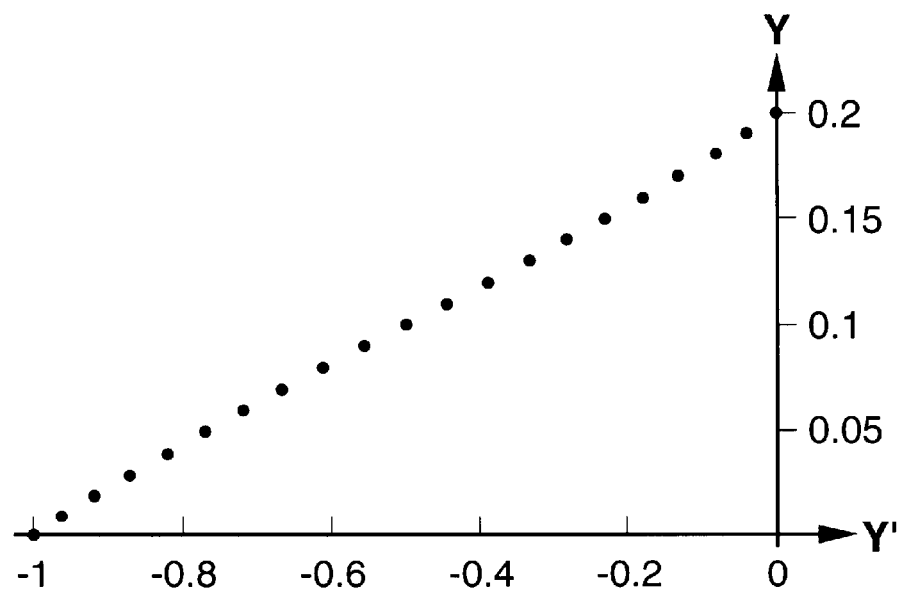
FIG. 47 is an example of a domain map generated according to the method shown in FIG. 17 applied to a continuous magnetic tape reference marker using a single-axis, yz-axis sensor configuration as shown in FIG. 16.

Using these parameters, a domain map from which the lateral offset Y can be determined is shown in FIG. 47. A linear approximation is given by:

$$Y=0.194+0.188*Y' \tag{38}$$

whereas a third order (cubic) polynomial approximation is given by:

$$Y=0.2+0.266*Y'+0.203*(Y')^2+0.135*(Y')^3. \tag{39}$$

Figure 48:
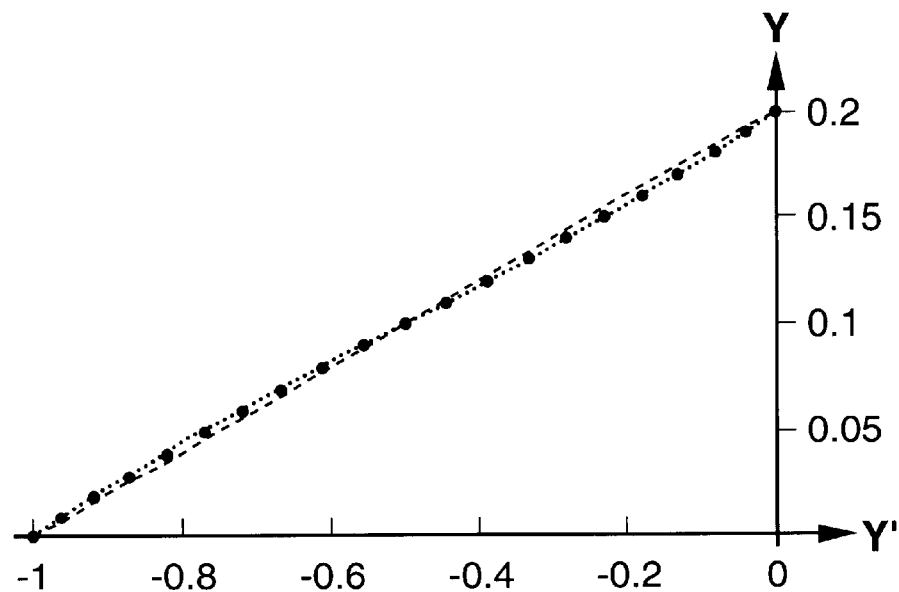
FIG. 48 is a graph showing a linear and polynomial fit of the curve shown in FIG. 47.

Referring to FIG. 48, the large dotted line is the actual mapping from FIG. 47, the small dotted line is the third order polynomial fit, and the dashed line is the linear approximation. As can be seen, the linear approximation provides very good results although the third order polynomial fit is more accurate and preferred.

10. Implementation.

The preferred manner of implementing the invention is to incorporate the sensing architecture and appropriate sensing algorithms based on the specific application. In a general sense, this implies use of the system based on the System-on-a-Chip (SoC) approach described above to implement the intelligence aspects (i.e., signal and data processing), including lateral offset algorithm implementation, use of appropriate magnetic sensing technology (herein, magnetoresistive), use of all digital signal processing components described above (e.g., Adaptive Gain Control, dynamic bandwidth adjustment for low-pass filter, removal of semi-static noise sources before amplification), and use of all-digital transmission of signals between system components. For the SoC component, physical implementation at this time would best be supported by either Field-Programmable Gate Array (FPGA) or Application-Specific Integrated Circuit (ASIC) technology. The choice here is mainly a matter of manufacturing scale. For limited market size applications, FPGA is the more reasonable choice. For large-scale markets, ASIC technology would be appropriate. Signal and data processing would not be carried out in a conventional large-scale computer system, as such a system is subject to many limitations and drawbacks in harsh environments, and is also not suitable for wide-scale deployment. The system would include all required interfaces to ancillary systems, including in-cab displays (visual, audible, haptic, or other), as well as all actuator systems (steering, throttle, brake), and all other required sensor systems (e.g. radar, speed, steering, GPS, inertial measurement, etc.).

In terms of the magnetometer configuration itself (i.e. monolithic smart sensor, longitudinal array of smart sensor nodes, lateral array of smart sensor nodes, satellite sensor nodes, combinatorial array), the invention is able to support all of these configurations, and the appropriate choice of configuration would be made based on the given application and/or vehicle geometry considerations. For example, in some snowplow installations, support frames will prevent use of a monolithic sensor bar, so that some lateral array of sensor bars would be more appropriate. For other installations, the monolithic approach provides greater robustness at reduced cost.

Figure 49:
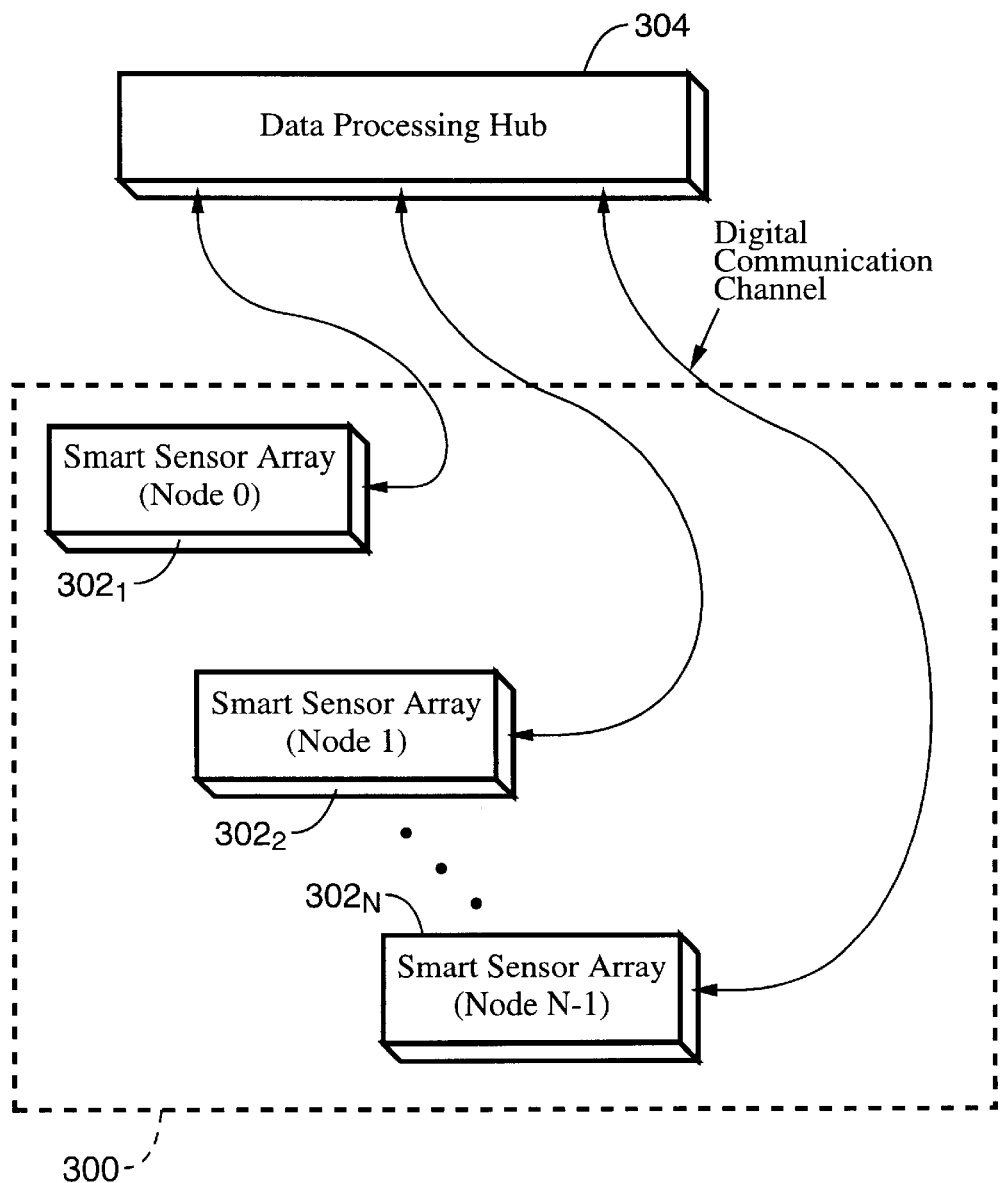
FIG. 49 is a functional block diagram of an embodiment a longitudinal array configuration of smart sensor nodes according to the present invention.
Figure 50:
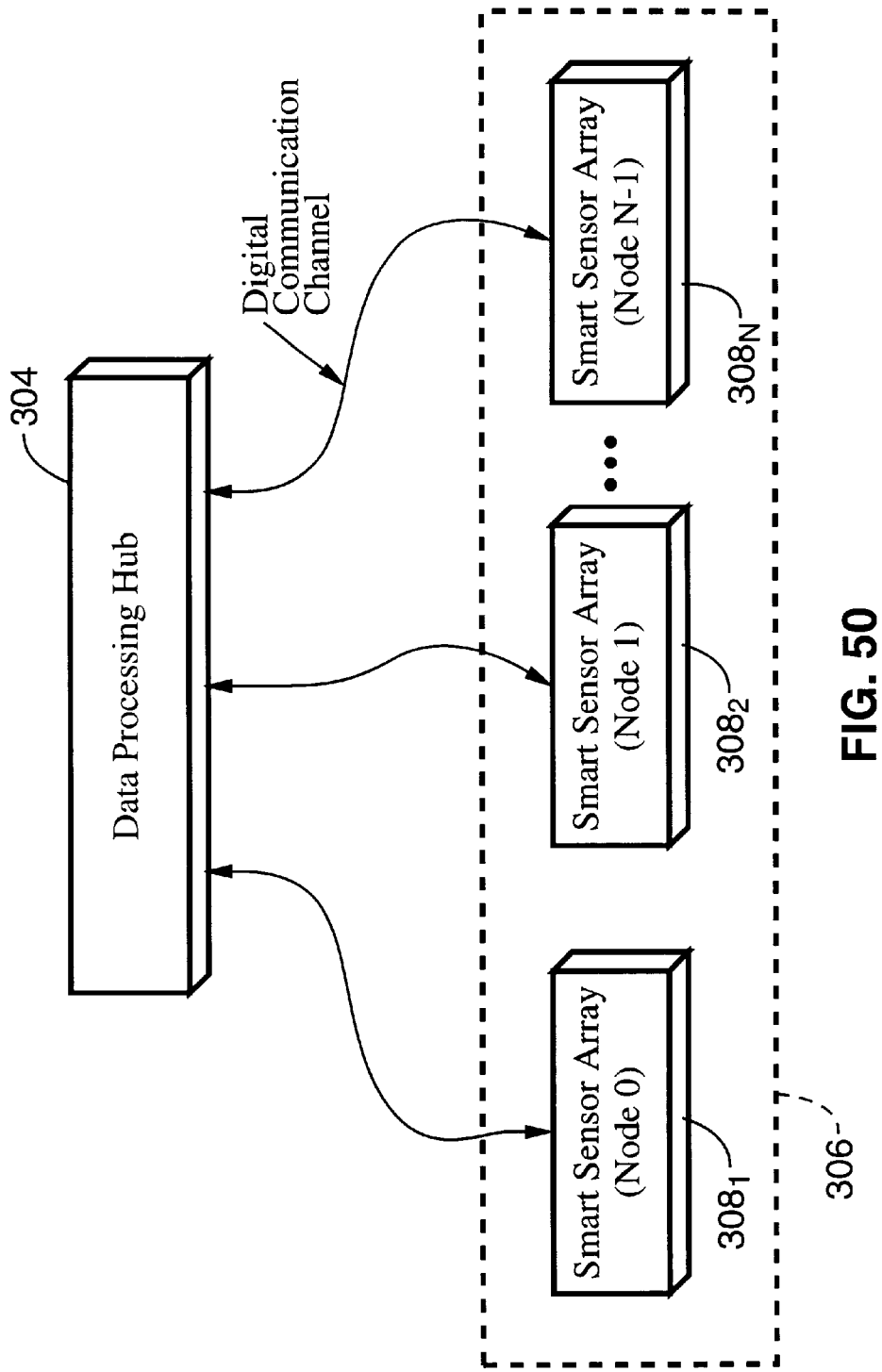
FIG. 50 is a functional block diagram of an embodiment of a lateral array configuration of smart sensor nodes according to the present invention.
Figure 51:
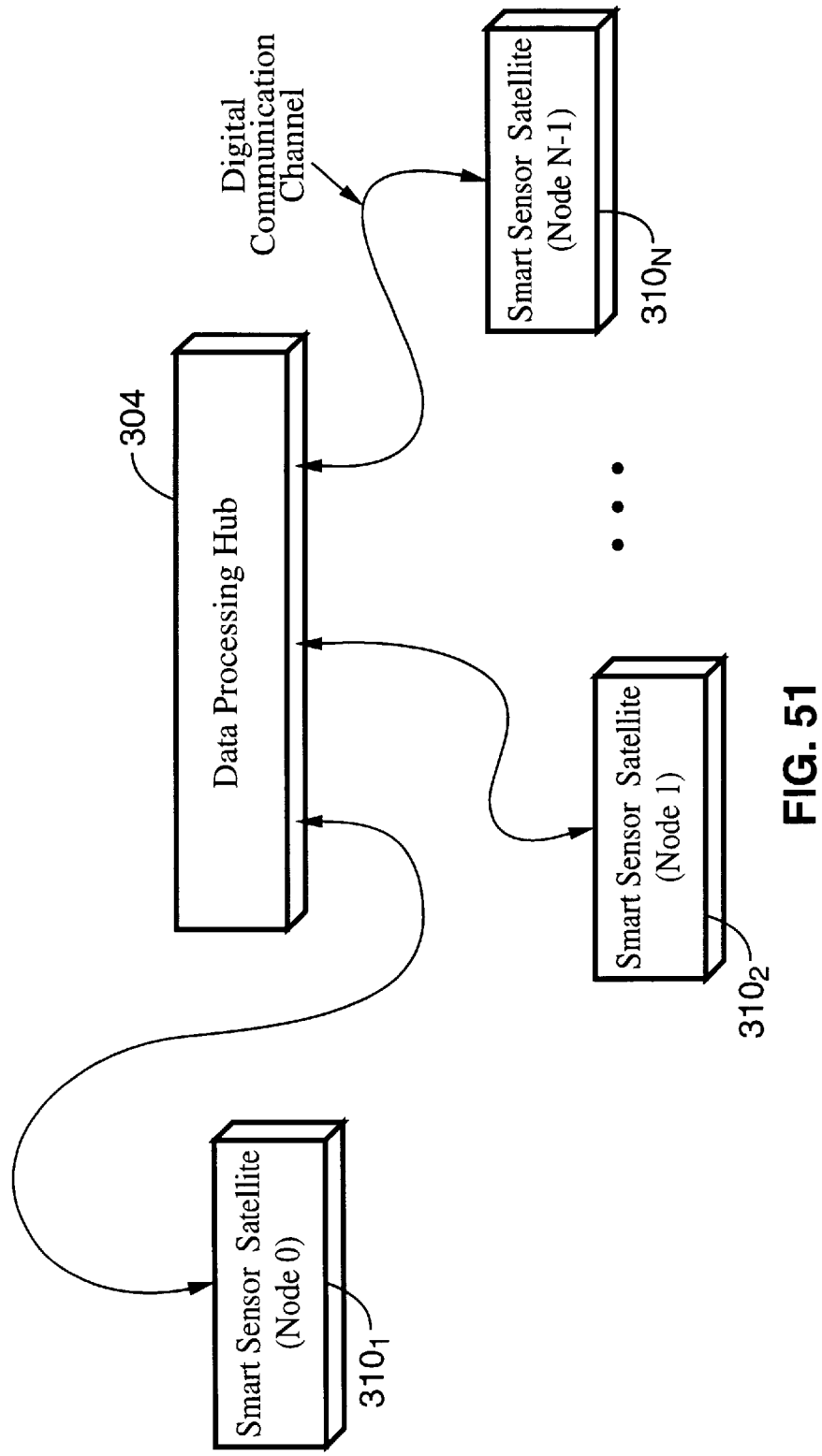
FIG. 51 is a functional block diagram of an embodiment of a satellite configuration of smart sensor nodes according to the present invention.
Figure 52:
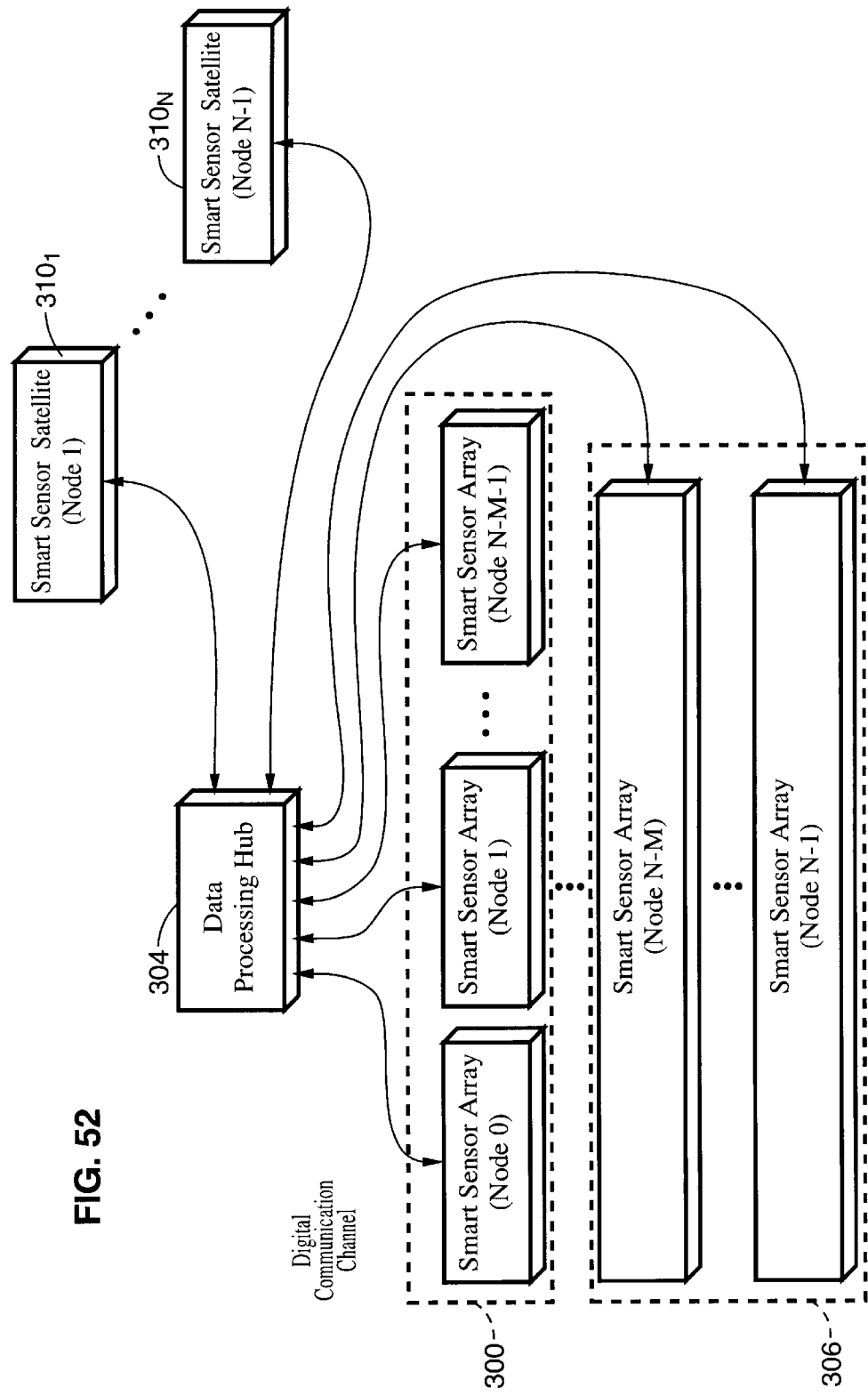
FIG. 52 is a functional block diagram of an embodiment of a combination array configuration of smart sensor nodes according to the present invention.

Examples of various configurations are shown in FIG. 49 through FIG. 53. Referring first to FIG. 49, a longitudinal array 300 of smart sensor nodes $302_1$ through $302_N$ is shown with the sensors connected to a digital data processing hub 304 as described herein. In contrast, FIG. 50 shows a lateral array 306 of smart sensor nodes $308_1$ through $308_N$ connected to hub 304. FIG. 51, on the other hand, depicts satellite sensor nodes $310_1$ through $310_N$ scattered in remote locations for remote Earth-field detection. Next, referring to FIG. 52, a combination of longitudinal and lateral arrays and satellite nodes is shown. Finally, FIG. 53 depicts a fully integrated or "monolithic" smart sensor array and processing system 400 connected to a display, actuators, and other peripherals 402.

Algorithm choice is also related to sensor configuration. In general, for a given sensor configuration, as dictated by the above considerations, a certain subset of the above algorithms will be appropriate. Within this subset, a specific algorithm may be most appropriate for a given sensing situation (e.g. location of the magnetometers relative to the magnet, or for certain field strength readings). In the preferred embodiment, the system will contain the intelligence to select the "best" algorithm from the available algorithm subset based on the current situation.

Those skilled in the art will appreciate that the invention described herein provided a number of incremental improvements over existing technology, and that those improvements can be practiced singly or in combination. One such improvement is a simple improvement in the magnetic sensor technology where analog versions of the magnetometer discussed above are used to replace existing off-the-shelf analog sensors. Use of the variable bandwidth low-pass filter on the sensor itself provides for signal filtering at the source, thus removing much of the noise before transmitting the analog signals to the central computing unit. With this improvement alone, the electronics packaging can be significantly reduced, as it is possible to remove relatively large custom I/O signal conditioning boards. With this reduction, it is feasible to use a smaller computer for the intelligence portion, and the resulting reduction in power requirements can reduce the size of that support system as well.

Another improvement arises from use of the algorithms of the present invention. The "ratio" form of these algorithms allows the system gains magnetic strength independence, height and longitudinal position insensitivity, and freedom from peak-detection, thus allowing signal sampling independent of vehicle speed and marker spacing. With this improvement, the system can then operate down to zero speed. Physical aspects of the implementation still can benefit by further inclusion of aspects of the current invention.

Another level of improvement to existing technology provided by the present invention is the combination of analog-to-digital conversion with the algorithms of the present invention. In this way, the magnetometers provide digital signals representing field strength, and the system uses digital transmission of the sensor information, effectively alleviating analog noise issues in transmitting signals from the sensors to the processing unit. One significant issue with this intermediate approach is available bandwidth. For example, if using serial communication with the RS-232 standard, there is a limit to the number of channels that can be supported at the rate needed for the lateral offset algorithms. For example, in existing snowplow applications, as well as many magnet-based vehicle control applications, the number of channels required (three axes per magnetometer, and six to ten magnetometers total) precludes this approach. However, for systems with a lower number of channels, this improvement does provide much added benefit. An additional benefit is the elimination of analog-to-digital conversion at the central computer. In this way, it is feasible to transition to a smaller form factor computer, such as a PC-104 or CompactPCI system, or even to an embedded PC. This aspect is a major improvement in packaging, and will allow for further reductions in other related subsystems, including power systems. It also provides good improvements in robustness, ruggedization, and possibly cost.

The Adaptive Gain Control, as well as the circuitry to remove semi-static noise, prior to amplification and analog-to-digital conversion provides additional incremental benefits. This approach maximizes dynamic range and bandwidth usage, and can allow use of a reduced number of bits for signal representation. It may still be subject to the bandwidth limitations described above, but to a lesser extent, so that it is feasible to support a larger number of channels.

Another benefit is the "Intelligent Sensing Architecture" described herein, ideally implemented in FPGA or ASIC technology, to determine lateral offset and other required information, at the level of the Intelligent Sensor Array or Hub. In this implementation, a centralized computer (possibly embedded PC or similar) still operates on the sensed lateral offset and other information in order to provide the output to displays, actuators, etc., and this centralized computing also interfaces to other sensors (radar, GPS, inertial measurement, etc.). Here, the data sent from the Intelligent Sensor to the central computer is greatly reduced, since the system must only send processed information (e.g. lateral offset, polarity, etc.) rather than a large number of individual digital magnetic field strength readings. Because of this, the bandwidth constraint is greatly reduced, and this approach does hold great promise. However, the remaining use of the centralized computer (whether industrial PC, CompactPCI, PC-104, or other embedded PC) is not the most desirable option, for long-term ruggedization, packaging, robustness, and commercial viability.

The greatest benefits are achieved by replacing the centralized computer with a System-on-a-Chip (SoC) implementation. This SoC, as discussed above, will interface to the Intelligent Sensing Architecture (for the magnetic reference system, discrete or continuous), and will also interface to all other input (radar, GPS, inertial measurement, etc.) and output (display, actuators, etc.) systems. It will also contain all control logic, driver assistance logic, obstacle detection logic, vehicle models, human models, and any other blocks required to support the desired functionality. This method again provides the highest level of benefits, and represents the preferred implementation of the present invention, particularly when considering commercial deployment.

Accordingly, the present invention provides a number of desirable and/or unique features. The architecture offers superior environmental operation, modularity, ease of installation, self-diagnostics, maintainability, portability, and size. It supports design modularity, which allows support for a wide variety of sensor and actuator configurations. In addition, components of the system can be developed in a way that they are self-diagnosing, and that allows for easy troubleshooting and replacement in the field. In preferred embodiment, wherein all data transmission between subsystems is through digital means, system noise is minimized, and installation is greatly eased (reduced cabling, package size, etc.). The architecture facilitates design and implementation of systems that are rugged, robust, commercially feasible, lower cost, manufacturable, maintainable, self-diagnosing, field-replaceable, customizable, easily reconfigured, easily reprogrammed, etc. Those skilled in the art will appreciate that the programming to implement the invention as described herein can be written for various platforms using conventional programming techniques. Accordingly, the details of the code are not presented herein.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Discrete Magnetic Marker Lateral Offset Algorithm Summary

| Notation | Axes | Exceptions | Note |
| --- | --- | --- | --- |
| Single-Axis | Y | | |
| Single-Axis | Z | | |
| Dual-Axis | X–Y | X = 0 | Formula and map inversion apply for $B_{yright}$ near zero |
| Dual-Axis | Y–Z | | |
| Triple-Axis | X–Y–Z | X = 0 | |

TABLE 2

Continuous magnetic marker lateral offset algorithm summary.

| Notation | Axes | Exceptions | Note |
| --- | --- | --- | --- |
| Single-Axis | Y | | |
| Single-Axis | Z | | |
| Dual-Axis | Y–Z | | |

What is claimed is:

1. A method for determining the position of an object relative to a magnetic reference marker, comprising:
    sensing, with a sensor, at least one axial field strength component of the magnetic field emitted from a magnetic reference;
    computing a ratio of said sensed axial field strength components wherein magnetic field strength is canceled out in said ratio; and
    determining a positional offset of said object from said magnetic reference as a function of said ratio;
    wherein said positional offset is determined without magnetic field strength signal peak detection;
    wherein said positional offset is determined independently of height of said sensor above said magnetic reference; and
    wherein said positional offset can be determined from either a continuous magnetic reference or a plurality of discrete magnetic references.

2. A method as recited in claim 1, wherein said ratio is dimensionless.

3. A method as recited in claim 1, wherein said positional offset is independent of magnetic reference field strength.

4. A method as recited in claim 1, further comprising domain mapping said ratio to said positional offset.

5. A method as recited in claim 1:
    wherein said magnetic reference comprises a magnetic infrastructure defining a roadway reference line; and
    wherein said positional offset comprises lateral offset in relation to said roadway reference line.

6. A method as recited in claim 1, wherein said sensor comprises a digital magnetometer.

7. A method as recited in claim 6, wherein said magnetometer comprises a multiple-axis magnetometer.

8. A method as recited in claim 6, wherein each said magnetometer provides magnetic field strength readings in digital form for all available axes.

9. A method as recited in claim 8, wherein said magnetometer communicates said field strength readings to a digital data processor.

10. A method as recited in claim 9, wherein said digital data processor processes said field strength readings to obtain said positional offset.

11. A method for determining the position of an object relative to a magnetic reference, comprising:
    sensing, with each of at least two sensors associated with an object, at least one axial field strength component of the magnetic field emitted from a magnetic reference;
    computing a ratio of said sensed axial field strength components wherein magnetic field strength is canceled out in said ratio; and
    determining a positional offset of said object from said magnetic reference as a function of said ratio;
    wherein said positional offset is determined without magnetic field strength signal peak detection;
    wherein said positional offset is determined independently of height of said sensor above said magnetic reference; and
    wherein said positional offset can be determined from either a continuous magnetic reference or a plurality of discrete magnetic references.

12. A method as recited in claim 11, wherein said ratio is dimensionless.

13. A method as recited in claim 11, wherein said positional offset is independent of magnetic reference field strength.

14. A method as recited in claim 11, further comprising domain mapping said ratio to said positional offset.

15. A method as recited in claim 11:
    wherein said magnetic reference comprises a magnetic infrastructure defining a roadway reference line; and
    wherein said positional offset comprises lateral offset in relation to said roadway reference line.

16. A method as recited in claim 11, wherein said sensors comprise digital magnetometers.

17. A method as recited in claim 16, wherein said magnetometers comprise multiple-axis magnetometers.

18. A method as recited in claim 17, wherein said magnetometers are configured in an array.

19. A method as recited in claim 16, wherein each said magnetometer provides magnetic field strength readings in digital form for all available axes.

20. A method as recited in claim 19, wherein said magnetometers communicate said field strength readings to a digital data processor.

21. A method as recited in claim 20, wherein said digital data processor processes said field strength readings to obtain said positional offset.

22. A method for determining the position of an object relative to a magnetic reference, comprising:

sensing, with each of at least two sensors associated with an object, at least one axial field strength component of the magnetic field emitted from a magnetic reference;

computing a ratio of said sensed axial field strength components wherein magnetic field strength is canceled out in said ratio; and determining a positional offset of said object from said magnetic reference as a function of said ratio;

wherein said positional offset is determined without magnetic field strength signal peak detection;

wherein said positional offset is determined independently of height of said sensor above said magnetic reference;

wherein said positional offset can be determined from either a continuous magnetic reference or a plurality of discrete magnetic references; and wherein determination of said positional offset is independent of magnetic reference field strength.

23. A method as recited in claim 22, wherein said ratio is dimensionless.

24. A method as recited in claim 22, further comprising domain mapping said ratio to said positional offset.

25. A method as recited in claim 22:

wherein said magnetic reference comprises a magnetic infrastructure defining a roadway reference line; and wherein said positional offset comprises lateral offset in relation to said roadway reference line.

26. A method as recited in claim 22, wherein said sensors comprise digital magnetometers.

27. A method as recited in claim 26, wherein said magnetometers comprise multiple-axis magnetometers.

28. A method as recited in claim 27, wherein said magnetometers are configured in an array.

29. A method as recited in claim 26, wherein each said magnetometer provides magnetic field strength readings in digital form for all available axes.

30. A method as recited in claim 29, wherein said magnetometers communicate said field strength readings to a digital data processor.

31. A method as recited in claim 30, wherein said digital data processor processes said field strength readings to obtain said positional offset.

32. A method for determining the position of an object relative to a magnetic reference, comprising:

sensing, with each of at least two sensors associated with an object, at least one axial field strength component of the magnetic field emitted from a magnetic reference infrastructure defining a roadway reference line;

computing a ratio of said sensed axial field strength components;

mapping lateral offset of said object in relation to said magnetic reference to said field strength ratio, said mapping representing an inverse map of said lateral offset as a function of said ratio;

inverting said inverse mapping to provide a forward map of said lateral offset as a function of said ratio; and determining said lateral offset of said object from said forward map;

wherein determination of said lateral offset is independent of magnetic reference field strength.

33. A method as recited in claim 32, wherein said ratio is dimensionless.

34. A method as recited in claim 32, further comprising domain mapping said ratio to said positional offset.

35. A method as recited in claim 32, wherein said sensors comprise digital magnetometers.

36. A method as recited in claim 35, wherein said magnetometers comprise multiple-axis magnetometers.

37. A method as recited in claim 36, wherein said magnetometers are configured in an array.

38. A method as recited in claim 35, wherein each said magnetometer provides magnetic field strength readings in digital form for all available axes.

39. A method as recited in claim 38, wherein said magnetometers communicate said field strength readings to a digital data processor.

40. A method as recited in claim 39, wherein said digital data processor processes said field strength readings to obtain said positional offset.

41. An apparatus for determining the position of an object relative to a magnetic reference marker, comprising:

a sensor associated with an object;

said sensor configured for sensing at least one axial field strength component of the magnetic field emitted from a magnetic reference;

a digital data processor; and programming associated with said digital data processor for computing a ratio of said sensed axial field strength components, wherein magnetic field strength is canceled out in said ratio; and determining a positional offset of said object from said magnetic reference as a function of said ratio;

wherein said positional offset is determined without magnetic field strength signal peak detection;

wherein said positional offset is determined independently of height of said sensor above said magnetic reference; and wherein said positional offset can be determined from either a continuous magnetic reference or a plurality of discrete magnetic references.

42. An apparatus as recited in claim 41, wherein said ratio is dimensionless.

43. An apparatus as recited in claim 41, wherein said positional offset is independent of magnetic reference field strength.

44. An apparatus as recited in claim 41, further comprising programming for domain mapping said ratio to said positional offset.

45. An apparatus as recited in claim 41:

wherein said magnetic reference comprises a magnetic infrastructure defining a roadway reference line; and wherein said positional offset comprises lateral offset in relation to said roadway reference line.

46. An apparatus as recited in claim 41, wherein said sensor comprises a digital magnetometer.

47. An apparatus as recited in claim 45, wherein said magnetometer comprises a multiple-axis magnetometer.

48. An apparatus as recited in claim 46, wherein said magnetometer provides magnetic field strength readings in digital form for all available axes.

49. An apparatus as recited in claim 48, wherein said magnetometer is configured to communicate said field strength readings to said digital data processor.

50. An apparatus as recited in claim 49, wherein said digital data processor processes said field strength readings to obtain said positional offset.

51. An apparatus for determining the position of an object relative to a magnetic reference, comprising:

at least two sensors associated with an object;

each said sensor configured for sensing at least one axial field strength component of the magnetic field emitted from a magnetic reference;

a digital data processor; and programming associated with said digital data processor for computing a ratio of said sensed axial field strength components wherein magnetic field strength is canceled out in said ratio; and determining a positional offset of said object from said magnetic reference as a function of said ratio;

wherein said positional offset is determined without magnetic field strength signal peak detection;

wherein said positional offset is determined independently of height of said sensor above said magnetic reference; and wherein said positional offset can be determined from either a continuous magnetic reference or a plurality of discrete magnetic references.

52. An apparatus as recited in claim 51, wherein said ratio is dimensionless.

53. An apparatus as recited in claim 51, wherein said positional offset is independent of magnetic reference field strength.

54. An apparatus as recited in claim 51, further comprising programming for domain mapping said ratio to said positional offset.

55. An apparatus as recited in claim 51:

wherein said magnetic reference comprises a magnetic infrastructure defining a roadway reference line; and wherein said positional offset comprises lateral offset in relation to said roadway reference line.

56. An apparatus as recited in claim 51, wherein said sensors comprise digital magnetometers.

57. An apparatus as recited in claim 56, wherein said magnetometers comprise multiple-axis magnetometers.

58. An apparatus as recited in claim 57, wherein said magnetometers are configured in an array.

59. An apparatus as recited in claim 56, wherein each said magnetometer provides magnetic field strength readings in digital form for all available axes.

60. An apparatus as recited in claim 59, wherein said magnetometers are configured to communicate said field strength readings to said digital data processor.

61. An apparatus as recited in claim 60, wherein said digital data processor processes said field strength readings to obtain said positional offset.

62. An apparatus for determining the position of an object relative to a magnetic reference, comprising:

at least two sensors associated with an object;

each said sensor configured for sensing at least one axial field strength component of the magnetic field emitted from a magnetic reference;

a digital data processor; and programming associated with said digital data processor for computing a ratio of said sensed axial field strength components wherein magnetic field strength is canceled out in said ratio; and determining a positional offset of said object from said magnetic reference as a function of said ratio;

wherein said positional offset is determined without magnetic field strength signal peak detection;

wherein said positional offset is determined independently of height of said sensor above said magnetic reference;

wherein said positional offset can be determined from either a continuous magnetic reference or a plurality of discrete magnetic references; and wherein determination of said positional offset is independent of magnetic reference field strength.

63. An apparatus as recited in claim 62, wherein said ratio is dimensionless.

64. An apparatus as recited in claim 62, further comprising programming for domain mapping said ratio to said positional offset.

65. An apparatus as recited in claim 62:

wherein said magnetic reference comprises a magnetic infrastructure defining a roadway reference line; and wherein said positional offset comprises lateral offset in relation to said roadway reference line.

66. An apparatus as recited in claim 62, wherein said sensors comprise digital magnetometers.

67. An apparatus as recited in claim 66, wherein said magnetometers comprise multiple-axis magnetometers.

68. An apparatus as recited in claim 67, wherein said magnetometers are configured in an array.

69. An apparatus as recited in claim 66, wherein each said magnetometer provides magnetic field strength readings in digital form for all available axes.

70. An apparatus as recited in claim 69, wherein said magnetometers are configured to communicate said field strength readings to said digital data processor.

71. An apparatus as recited in claim 70, wherein said digital data processor processes said field strength readings to obtain said positional offset.

72. An apparatus for determining the position of an object relative to a magnetic reference, comprising:

at least two sensors associated with an object;

each said sensor configured for sensing at least one axial field strength component of the magnetic field emitted from a magnetic reference infrastructure defining a roadway reference line;

a digital data processor; and programming associated with said digital data processor for computing a ratio of said sensed axial field strength components wherein magnetic field strength is canceled out in said ratio; and determining lateral offset of said object from said magnetic reference as a function of said ratio by domain mapping said ratio to said positional offset;

wherein said lateral offset is determined without magnetic field strength signal peak detection;

wherein said lateral offset is determined independently of height of said sensor above said magnetic reference;

wherein said lateral offset can be determined from either a continuous magnetic reference or a plurality of discrete magnetic references; and wherein determination of said lateral offset is independent of magnetic reference field strength.

73. An apparatus as recited in claim 72, wherein said ratio is dimensionless.

74. An apparatus as recited in claim 72, wherein said sensors comprise digital magnetometers.

75. An apparatus as recited in claim 74, wherein said magnetometers comprise multiple-axis magnetometers.

76. An apparatus as recited in claim 75, wherein said magnetometers are configured in an array.

77. An apparatus as recited in claim 74, wherein each said magnetometer provides magnetic field strength readings in digital form for all available axes.

78. An apparatus as recited in claim 77, wherein said magnetometers are configured to communicate said field strength readings to said digital data processor.

79. An apparatus as recited in claim 78, wherein said digital data processor processes said field strength readings to obtain said positional offset.

80. An apparatus for determining the position of an object relative to a magnetic reference, comprising:

at least two sensors associated with an object;

each said sensor configured for sensing at least one axial field strength component of the magnetic field emitted from a magnetic reference infrastructure defining a roadway reference line;

a digital data processor; and programming associated with said digital data processor for computing a ratio of said sensed axial field strength components;

mapping lateral offset of said object in relation to said magnetic reference to said field strength ratio, said mapping representing an inverse map of said lateral offset as a function of said ratio;

inverting said inverse mapping to provide a forward map of said lateral offset as a function of said ratio; and determining said lateral offset of said object from said forward map;

wherein determination of said lateral offset is independent of magnetic reference field strength.

81. An apparatus as recited in claim 80, wherein said ratio is dimensionless.

82. An apparatus as recited in claim 80, further comprising domain mapping said ratio to said positional offset.

83. An apparatus as recited in claim 80, wherein said sensors comprise digital magnetometers.

84. An apparatus as recited in claim 83, wherein said magnetometers comprise multiple-axis magnetometers.

85. An apparatus as recited in claim 84, wherein said magnetometers are configured in an array.

86. An apparatus as recited in claim 83, wherein each said magnetometer provides magnetic field strength readings in digital form for all available axes.

87. An apparatus as recited in claim 86, wherein said magnetometers communicate said field strength readings to a digital data processor.

88. An apparatus as recited in claim 87, wherein said digital data processor processes said field strength readings to obtain said positional offset.

* * * * *